United States Patent
Mukherjee et al.

(10) Patent No.: US 9,258,820 B2
(45) Date of Patent: Feb. 9, 2016

(54) METHOD AND SYSTEM FOR REQUESTING A SERVICE UTILIZING A SEQUENCE OF CODES

(75) Inventors: Biswaroop Mukherjee, Stittsville (CA); Tarik Tabet, Montreal (CA); William Anthony Gage, Stittsville (CA); Robert Novak, Stittsville (CA); Siva Dharshan Muruganathan, Stittsville (CA)

(73) Assignee: BlackBerry Limited, Waterloo, CA (US)

( * ) Notice: Subject to any disclaimer, the term of this patent is extended or adjusted under 35 U.S.C. 154(b) by 1122 days.

(21) Appl. No.: 13/295,499

(22) Filed: Nov. 14, 2011

(65) Prior Publication Data
US 2013/0121259 A1 May 16, 2013

(51) Int. Cl.
*H04J 3/00* (2006.01)
*H04W 72/04* (2009.01)
*H04W 72/12* (2009.01)

(52) U.S. Cl.
CPC ...... *H04W 72/0466* (2013.01); *H04W 72/1205* (2013.01)

(58) Field of Classification Search
CPC ............. H04W 72/12; H04W 72/121; H04W 72/1257; H04W 72/1263; H04W 72/1268; H04W 72/1278; H04W 72/1284; H04W 72/1289; H04W 72/1294; H04W 72/14; H04W 72/02; H04W 72/0413; H04W 72/042; H04W 72/044; H04W 72/0446; H04W 72/0453; H04W 72/0466; H04W 72/048; H04W 72/0486; H04W 72/0493; H04W 72/06; H04W 72/08; H04W 72/10
See application file for complete search history.

(56) References Cited

U.S. PATENT DOCUMENTS

| 6,577,684 | B1 | 6/2003 | Hirano | |
|---|---|---|---|---|
| 8,493,911 | B2 | 7/2013 | Park et al. | |
| 2007/0155390 | A1 | 7/2007 | Kodikara Patabandi et al. | |
| 2007/0161377 | A1* | 7/2007 | Kodikara Patabandi et al. | 455/450 |
| 2008/0316959 | A1 | 12/2008 | Bachl et al. | |
| 2010/0331003 | A1 | 12/2010 | Park | |
| 2011/0321050 | A1* | 12/2011 | Ho et al. | 718/102 |
| 2012/0213195 | A1* | 8/2012 | Lunttila et al. | 370/330 |
| 2013/0039231 | A1* | 2/2013 | Wang | 370/280 |

(Continued)

FOREIGN PATENT DOCUMENTS

| WO | 2009118285 A2 | 10/2009 |
|---|---|---|
| WO | WO 2011042042 A1 * | 4/2011 |
| WO | 2011082110 A1 | 7/2011 |

OTHER PUBLICATIONS

International Search Report on International Application No. PCT/CA2011/001247 mailed Jun. 14, 2012.

(Continued)

*Primary Examiner* — Alvin Zhu
(74) *Attorney, Agent, or Firm* — Moffat & Co.

(57) ABSTRACT

A method, at a signaling entity, for sending a signal to a signaled entity, the method determining, at the signaling entity, at least a first code of a sequence of codes comprising the signal; receiving, at the signaling entity, an assignment of resources from the signaled entity for transmission of at least the first code of the sequence of codes; transmitting, utilizing at least the first code of the sequence of codes and the assignation, the signal, wherein at least the first code of the sequence of codes is shared among a plurality of signaling entities; and sending, utilizing subsequent codes of the sequence of codes, the signal, wherein the sequence of codes is unique to the signal.

22 Claims, 12 Drawing Sheets

(56) References Cited

U.S. PATENT DOCUMENTS

2013/0081026 A1 3/2013 Malkamaki et al.
2013/0121258 A1 5/2013 Mukherjee
2013/0121260 A1 5/2013 Mukherjee

OTHER PUBLICATIONS

International Search Report on International Application No. PCT/CA2011/001248 mailed Jun. 20, 2012.
Research in Motion UK Ltd., et al, 3GPP TSG RAN Meeting #51 RP-110454 Kansas City, USA, Mar. 15-18, 2011 "New Work Item Proposal for LTE RAN Enhancements for Diverse Data Applications" (feature).
Vodafone: TSG RAN meeting #53 RP-111112 Fukuoka, Japan, Sep. 13-16, 2011 "Proposed SID: Provision of low-cost MTC UEs based on LTE".
Michael Jiang, Milan Nikolic, Stephen Hardy, and Ljiljana Trajkovic, "Impact of self-similarity on wireless data network performance", ICC 2001.
Will E. Leland, Murad S. Taqqu, Walter Willinger, and Daniel V. Wilson, "On the Self-similar Nature of Ethernet Traffic", IEEE/ACM Transactions on networking. vol. 2, No. 1, Feb. 1994.
Haitham Cruickshank, "Internet QoS Measurement and Traffic Modelling", ATS Stuttgart, Jan. 2003.
3GPP TS 36.300, "Evolved Universal Terrestrial Radio Access (E-UTRA); Overall Description", V 10.2.0.
3GPP TS 36.213, "Evolved Universal Terrestrial Radio Access (E-UTRA); Physical Layer procedures", V 10.2.0.
3GPP TS 36.331, "Evolved Universal Terrestrial Radio Access (E-UTRA); Radio Resource Control (RRC); Protocol specification", V.10.2.0.
3GPP TS 36.211, "Evolved Universal Terrestrial Radio Access (E-UTRA); Physical Channels and Modulation; Protocol specification", V.10.2.0.
3GPP Ts 36.321, "Evolved Universal Terrestrial Radio Access (E-UTRA); Medium Access Control (MAC) protocol specification; Protocol specification", V.10.2.0.
Research in Motion UK Ltd., et al, 3GPP TSG RAN Meeting #51 RP-110454 Kansas City, USA, Mar. 15-18, 2011 "New Work Item Proposal for LTE RAN Enhancements for Diverse Data Applications" (core).
Patrick Loiseau, Paulo Goncalves, Guillaume Dewaele, Pierre Borgnat, Patrice Abry, and Pascale Vicat-Blanc Primet, "Investivgating Self-Similarity and Heavy-Tailed Distributions on a Large-Scale Experimental Facility", IEEE/ACM Transactions on Networking, vol. 18, No. 4, Aug. 2010.
3GPP TSG-RAN #53 RP-111097 Fukuoka, Japan, Sep. 13-16, 2011 "Further RAN Improvements for Machine-type Communications".
3GPP TR 37.868 V11.0.0 (Sep. 2011) 3rd Generation Partnership Project; Technical Specification Group Radio Access Network; Study on RAN Improvements for Machine-type Communications; (Release 11).
3GPP TR 37.868 V1.0.0 (Aug. 2011) 3rd Generation Partnership Project; Technical Specification Group Radio Access Network; Study on RAN Improvements for Machine-type Communications; (Release 10).
Huawei, 3GPP TSG-RAN #53 RP-111107 Fukuoka, Japan, Sep. 13-16, 2011 "New WI proposal: RAN overload control for Machine-Type Communications (Feature part)".
Huawei, 3GPP TSG-RAN #53 RP-111107 Fukuoka, Japan, Sep. 13-16, 2011 "New WI proposal: RAN overload control for Machine-Type Communications (Core part)".
International patent application No. PCT/CA2011/001249, International Search Report and Written Opinion of the International Searching Authority, dated Jul. 4, 2012.
United States Patent and Trademark Office, Office Action, U.S. Appl. No. 13/295,460, Jan. 5, 2015.
United States Patent and Trademark Office, Office Action, U.S. Appl. No. 13/295,605, Jan. 29, 2015.
United States Patent and Trademark Office, Office Action, U.S. Appl. No. 13/295,460, Jun. 24, 2015.
United States Patent and Trademark Office, Office Action, U.S. Appl. No. 13/295,605, Jun. 17, 2015.

\* cited by examiner

METHOD AND SYSTEM FOR REQUESTING A SERVICE UTILIZING A SEQUENCE OF CODES

FIELD OF THE DISCLOSURE

The present disclosure relates to unpredictable bursty signaling in a communication system and in particular to requesting and servicing requests using minimal system resources within a latency bound.

BACKGROUND

Local area network and wide area network traffic in the internet typically has packet bursts, where the size and timing of the bursts statistically follows a heavy tailed distribution. For example, non-voice traffic patterns for internet-like applications are typically generated in situations such as when user activity occurs, when applications generate uplink network traffic, when network traffic is sent to the internet in general, when a server responds, when downlink traffic arrives for a device or when an application complies with user activities such as displaying a page, starting a stream etc. All of this traffic has a statistical distribution where some of the packets arrive or are sent quickly while others arrive or are sent later.

In systems where a service needs to be requested, system resources must be made available to allow one entity to signal a request for a service from another entity. For example, in systems where transmission resources need to be requested, the bursty nature of the traffic typically requires a network element to compromise between the number of signaling resources pre-allocated for sending a request for transmission resources, the number of devices that can request service, and the latency that each device experiences. For example, in mobile systems a mobile device may need to request resources in order to send uplink traffic. However, with many mobile devices being serviced by a network element, the network element needs to typically pre-allocate many resources for uplink requests and to monitor these uplink requests. The higher the number of pre-allocated uplink request slots or resources that exist for sending requests, the fewer the number of resources available for transmitting mobile user traffic. However, if the number of pre-allocated uplink request slots or resources is reduced, the longer a device may need to wait before being able to request uplink resources. For some services this latency causes a poor user experience.

BRIEF DESCRIPTION OF THE DRAWINGS

The present disclosure will be better understood with reference to the drawings, in which.

DETAILED DESCRIPTION

Figure 1:
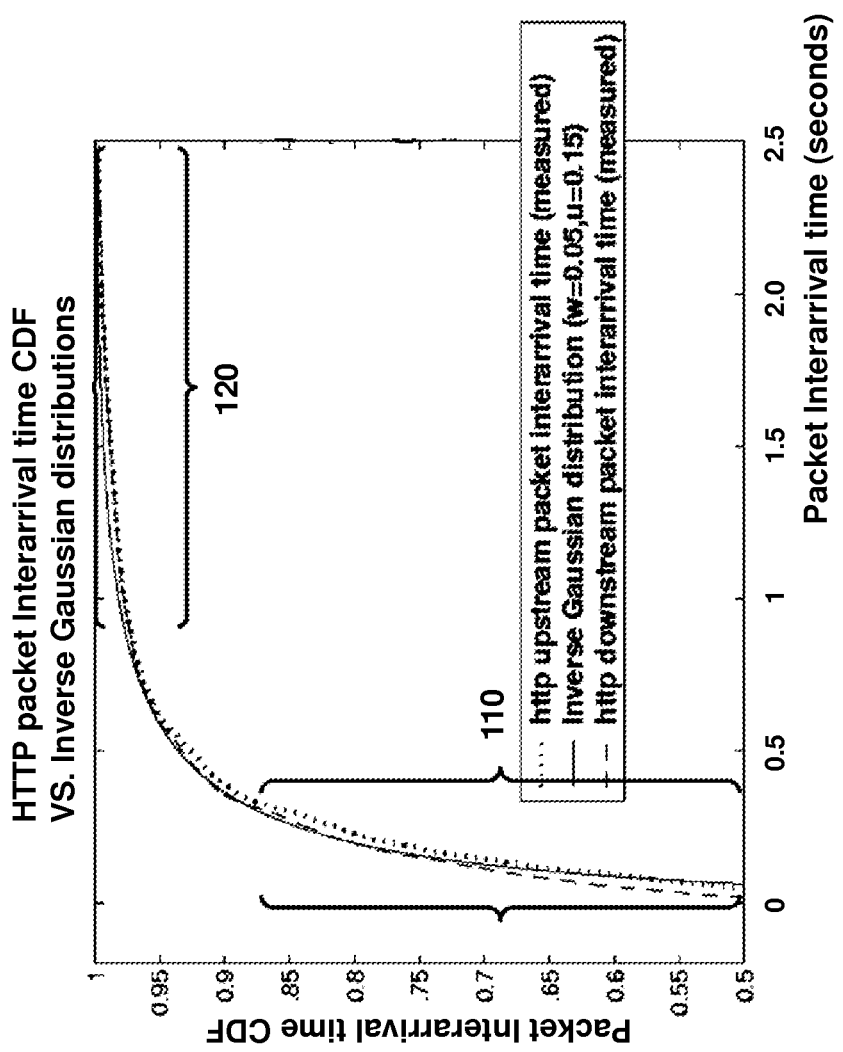
FIG. 1 is a plot showing a packet inter-arrival time cumulative distribution function versus an Inverse Gaussian distribution.

The present disclosure provides a method, at a signaling entity, for sending a signal to a signaled entity, the method comprising: determining, at the signaling entity, at least a first code of a sequence of codes comprising the signal; receiving, at the signaling entity, an assignation of resources from the signaled entity for transmission of at least the first code of the sequence of codes; transmitting, utilizing at least the first code of the sequence of codes and the assignation, the signal, wherein at least the first code of the sequence of codes is shared among a plurality of signaling entities; and sending, utilizing subsequent codes of the sequence of codes, the signal, wherein the sequence of codes is unique to the signal.

The present disclosure further provides a user equipment acting as a signaling entity comprising: a processor; and a communications subsystem, wherein the processor and communications subsystem are configured to: determine, at least a first code of a sequence of codes comprising a unique signal; receive, at the user equipment, an assignation of resources from a network element, for transmission of at least the first code of the sequence of codes; transmit, utilizing at least the first code of the sequence of codes and the assignation, a signal, wherein at least the first code of the sequence of codes is shared among a plurality of user equipments; and send, utilizing subsequent codes of the sequence of codes, the signal, wherein the sequence of codes is unique to the signal.

The present disclosure further provides a method, at a network element, acting as a signaled entity, for receiving a signal from at least one of a plurality of user equipments, the method comprising: sending, from the network element, an assignation of resources to at least one user equipment of the plurality of user equipments, to control the transmission of at least the first code of a sequence of codes; receiving the first code of the sequence of codes, where at least the first code of the sequence of codes is shared among a plurality of user equipments; further receiving, subsequent codes of the sequence of codes; and identifying, utilizing the received sequence of codes, the unique signal sent.

In one embodiment, the present disclosure provides a method and system that allows a large number of signaling entities to request a service from a signaled entity in a manner that meets the latency bounds of the user applications while minimizing the number of system resources pre-allocated for signaling.

The present disclosure is described below with regard to a Third Generation Partnership Project (3GPP) Long Term Evolution (LTE) architecture. However, this is meant to be exemplary only and the present embodiments could be applied equally to other network architectures.

LTE systems are able to offer high throughput and peak rates that can be flexibly allocated to users during short scheduling intervals. For example such an interval may be 1 millisecond. However, the size, configuration and allocation of the control channels is less flexible, especially for uplink control channels. LTE is also suitable for mobile Internet traffic because it schedules use of radio resources only in accordance with traffic demands.

Scheduling of resources for both downlink and uplink traffic is controlled by the evolved NodeB (eNB) on the network side of the radio link, where the eNB allocates resources for the UE to send in the uplink or allocates resources and sends to the UE in the downlink. When used herein, resource can include a time, frequency or code resource, among others. When a user equipment (UE) has data that it needs to transmit on the uplink, the UE may send a scheduling request (SR) to the eNB to obtain an allocation of uplink transmission resources. In one embodiment, a UE can only send a scheduling request at pre-determined intervals dictated by the eNB. Due to the sporadic and bursty nature of Internet traffic, providing suitable opportunities for transmitting scheduling requests is difficult to accomplish efficiently.

With bursty traffic, if the interval for sending a scheduling request (SR) is set conservatively to a small value in order to minimize latency, very few SR opportunities will actually be used by a UE. In addition, the allocation of frequent SR opportunities to a UE necessarily restricts the number of uplink resources available to other UEs. While low latency is accomplished, since a particular UE will have the ability to request uplink transmission resources more frequently, less UEs are able to use the network.

Conversely, if a higher interval between SR opportunities is used, there is an increased risk of very large latencies that, in turn may cause a very poor user experience. Specifically, the user equipment may not be able to request uplink transmission resources within a sufficient quality of service (QoS) time.

For example, referring to FIG. 1, the figure shows a plot derived by Haitham Cruickshank, "Internet QoS Measurement and Traffic Modelling", ATS Conference 2003, Stuttgart, which shows a hypertext transfer protocol (HTTP) packet inter-arrival time cumulative distribution function (CDF) verses an inverse Gaussian distribution.

In particular, in a first region 110, shows a short inter-arrival time for packets. However, region 120 shows a very long inter-arrival time for packets. This thus shows the uplink and downlink measured inter-arrival times that are bursty and shows the heavy tailed distribution discussed above. Further, the plot shows that there is no optimum interval to schedule between SR opportunities.

Random Access Procedure

The random access procedure is used by a user equipment to send requests to a, Evolved Universal Terrestrial Radio Access (EUTRA) network.

Figure 2:
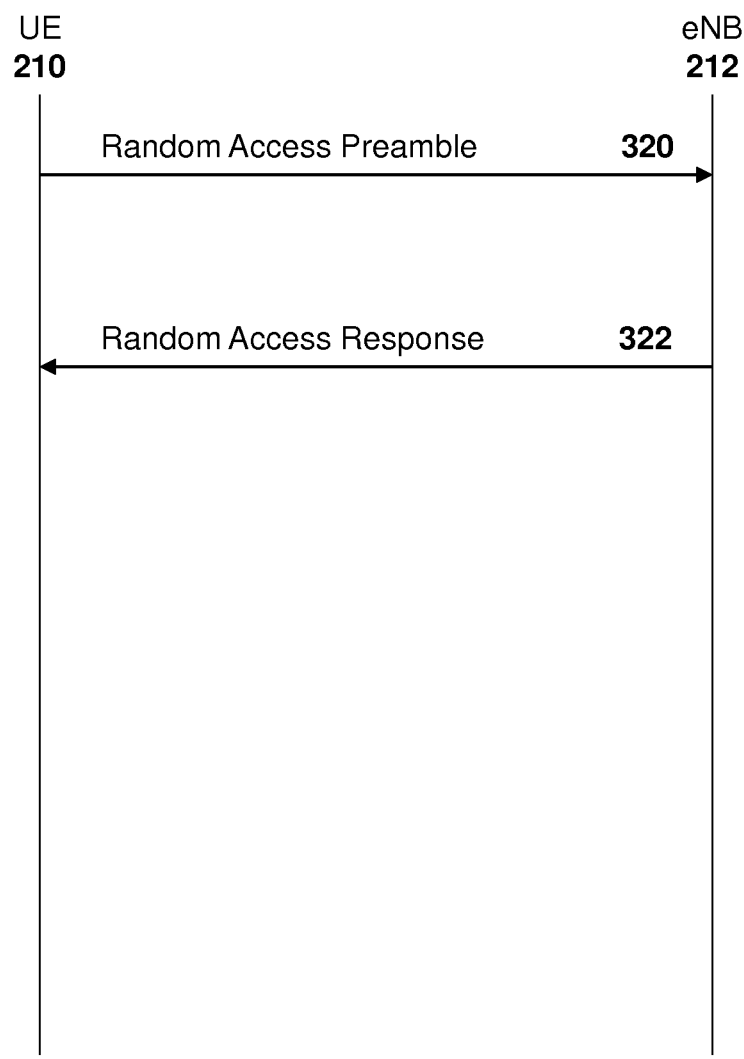
FIG. 2 is a flow diagram showing a random access procedure between a UE and eNB.

Reference is now made to FIG. 2, which shows the random access procedure between a UE 210 and an eNB 212.

In particular, a random access preamble 220 is sent from UE 210 to eNB 212. The random access preamble is selected from a set of preamble indices to enable the network to establish an estimate of uplink timing.

In response, eNB 212 sends a random access response 222 back to UE 210. The network response provides an indication of subsequent temporary uplink resources for further steps in the random access procedure. Random access response message contents are sent in a downlink shared control channel transmission.

In some situations, such as during handover, the procedure can operate in a contention free manner and only messages 320 and 322 are carried out. In these scenarios, the eNB signals, via dedicated RRC signalling, the random access preamble that the UE will use prior to the UE sending the random access preamble message 320. The assigned or dedicated preamble is not a member of the set of contention-based preambles that are indicated for normal random access on the system information broadcast in the cell.

Within a cell there are 64 preamble sequences available. These are split into two sets of sequences to be used for contention based access and a third set which is reserved for contention free access.

Uplink Transmission

Figure 3:
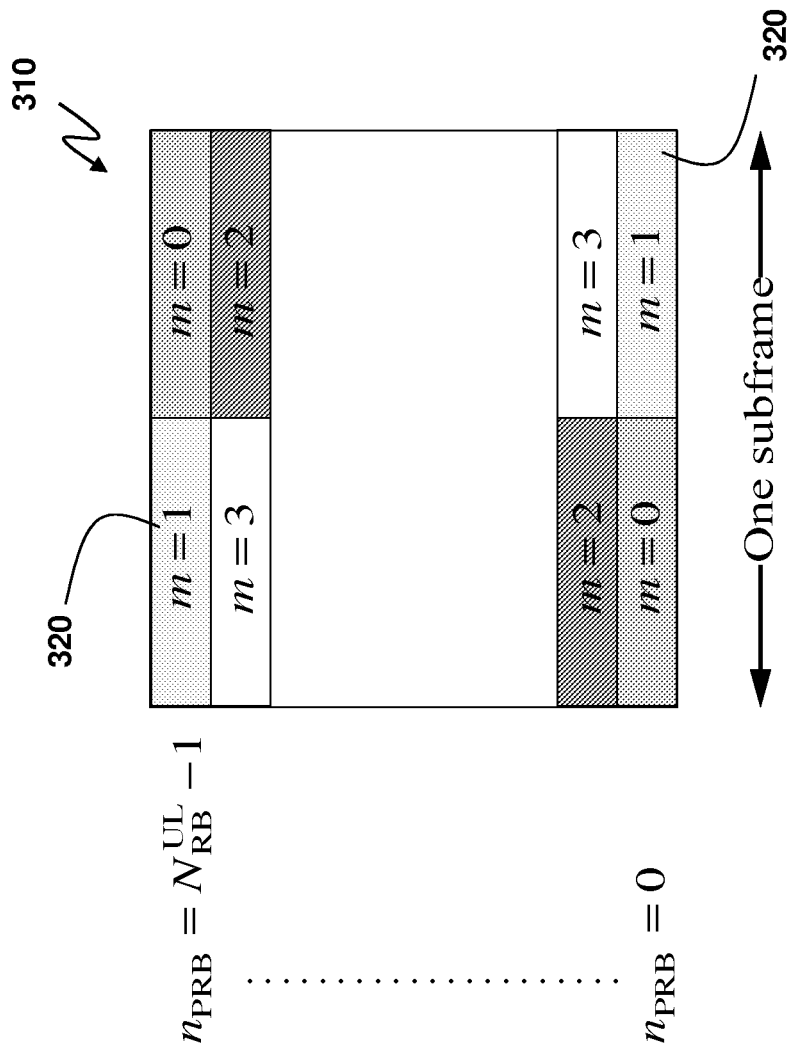
FIG. 3 is a block diagram of a subframe including scheduling requests.

Resource blocks for transmitting the uplink control signalling on the PUCCH are located on the outer edges of the uplink system bandwidth as illustrated in FIG. 3. The allocated PUCCH resource blocks are paired between slots within a subframe. However, in order to provide frequency diversity, 1 RB is located on the upper or lower edge of the spectrum within the first slot and another RB is reserved at the lower or upper edge of the spectrum within the second slot. As more RBs are required to support more users than more frequency adjacent RBs are allocated. The PUCCH therefore constitutes an upper control region which is frequency multiplexed with non-PUCCH uplink resources.

Therefore, referring to FIG. 3, one subframe 310 is shown having a plurality of resource blocks. As seen, a first resource block 320 is allocated both in the upper and the lower edge of the spectrum.

For smaller signalling messages, available bandwidth within 1 RB is greater than a single UE needs and, as such, signalling from multiple UEs can be allocated to the same PUCCH RB. This is achieved through code multiplexing in which different UEs are assigned different spreading sequences in the frequency domain or time and frequency domains.

To implement frequency domain spreading, a specific cyclic shift of a length-12 cell specific spreading sequence is used and applied across the 12 subcarriers of the RB. In order to maintain orthogonality under the dispersive channel conditions, it may be desirable that not all 12 cyclic shifted versions of the sequence are used and only a subset of the codes are in fact used. For example, only 6 cyclic shifts may be utilized. The number of cyclic shifts allowed is configured by the eNB.

For even smaller PUCCH message payloads, the above mentioned length-12 frequency domain spreading may also be augmented by spreading in the time domain. This may be used, for example, when only 1 or 2 bit transmissions are sent in the case of PUCCH format 1/1a/1b for HARQ-ACK or SR transmissions. The time domain spreading usually employs a length 4 orthogonal code for the data symbols and a length 3 for the demodulation reference symbol.

Thus, when using time and frequency domain spreading, in one example a frequency multiplexing of order 6 is combined with time multiplexing of order 3, thereby allowing a 3×6=18 UEs to be orthogonally multiplexed and hence uniquely identified within an RB.

eNB Uplink Scheduler

When a UE has data to transmit and it has no valid granted resources in which to do so, the UE informs the eNB in order to have the eNB's uplink scheduler assign an uplink grant of Physical Uplink Shared Channel (PUSCH) resources to the UE. The mechanisms by which the UE indicates the need for uplink resources are dependent on several factors, including whether the UE is time synchronized or not.

For non-time-synchronized UEs, a random access procedure is first performed to obtain an initial allocation of uplink resources. The UE may then transmit a buffer status report to the eNB, thereby informing the eNB that the UE requires additional uplink transmission resources.

For time-synchronized UEs, if there are no dedicated periodic Physical Uplink Control Channel (PUCCH) resources that are assigned to the UE, then the UE may initiate a random access procedure and transmit a BSR, as described above with regard to the non-time-synchronized UEs.

Conversely, if periodic PUCCH SR resources are assigned to the UE, the UE waits until the next PUCCH SR opportunity and sends a scheduling request via the PUCCH.

When the UE sends a scheduling request, it does so using specific PUCCH scheduling request resources that are exclusively assigned by the eNB to that UE. As the specific PUCCH scheduling request resources are a dedicated resource, the UE does not need to provide any identification as the UE is known by the eNB implicitly based on the received resources used for the scheduling request.

The UE determines the need to send an SR upon receiving data into its transmission buffer when it has no existing uplink grant on which to transmit data. The SR is sent at the next available SR opportunity, which is a function of the dedicated PUCCH SR resources as assigned by the eNB to the UE.

PUCCH SR resources in a subframe are defined in terms of a specific cyclic shift of a cell specific frequency domain spreading sequence in a specific time-domain orthogonal cover code. The subframe to be used is specified by a specific subframe offset and subframe duty cycle. Parameters are sent through RRC signalling and are used to specify the PUCCH resources assigned to the UE for SR purposes. The RRC parameter sr-PUCCH-ResourceIndex indicates the cyclic shift in the orthogonal cover parameters to the UE, while the RRC parameter sr-ConfigIndex indicates the subframe to use.

The SR itself is a simple on/off signal and conveys nothing regarding the amount of data the UE wishes to transmit. The amount of data to be transmitted is resolved by the eNB uplink scheduler, either by allocation of a small uplink grant sufficient for a BSR to be returned, which may then be used to adjust subsequent uplink grants once data transfer is commenced, or by knowledge regarding the service for which the request is made.

When the UE has a grant it may then provide the eNB scheduler with ongoing further details regarding the buffer status and power headroom status information. These are used by the eNB to control the resources assigned to the UE while the remaining buffered data is sent.

If a UE does not have PUCCH resource for sending a scheduled request then the UE reverts to the random access procedure.

Based on all of the above, an issue with servicing unpredictable bursty traffic in a communication system is how to use minimum resources while serving traffic within a set latency bound. This issue is more complex for the uplink since the resources assignment occurs at an entity different than that requiring the resource. Namely, the UE requires the resource but the scheduling is done by the eNB. Further, such uplink scheduling may occur at unpredictable times. Also, in a wireless system the problem also requires the use of minimal power at the UE.

Internet traffic is a large part of the traffic serviced by increasingly large number of UEs that use wireless communications systems. A solution must therefore support a large number of UEs as well as efficiently deal with bursty traffic. The quality of service, and specifically the latency performance, afforded to web traffic may have a bearing on user experience and therefore cannot be too large and must be bounded by appropriate values. Unpredictable bursty traffic occurs commonly on the Internet, where the distribution of the arrival time of the bursts as well as the burst sizes have long tails. The traffic pattern is expected to be such that there will be a large fraction of packets with an inter-arrival time below the average value. When using existing mechanisms based on dedicated PUCCH resources for SRs the time between SR opportunities could be much larger than the latency bound required by the quality of service. This is especially the case when the amount of PUCCH resources is constrained and a large number of UEs each need to be assigned dedicated PUCCH SR resources.

Alternatively, a larger amount of PUCCH SR resources may be reserved by the eNB in order to meet latency requirements of the UEs, although this could lead to inefficient resource allocation because many of the SR opportunities may not be used. For example, using current periodic PUCCH allocations to meet a latency on the order of 10 ms for common interactive applications requires significant increases in the average number of SR opportunities allocated to a UE, even though most of the resources will not end up being used.

Based on the above, the present disclosure provides for methods to allow a large number of UEs that generate bursty traffic to request uplink resources within a latency bound using minimal radio resources.

Resource Allocation

The present disclosure provides for UEs to send a sequence of codes to an eNB in order to request uplink resources. The UE is assigned a sequence of codes which may uniquely identify the UE. The sequence may be assigned when the UE first registers with the eNB, or at some other time. Opportunities for sending the first code are assigned up to a plurality of UEs by the eNB, for example, by means of pre-configuration of those first resources. The pre-configuration may, for example, provide a long term assignment of the first resource on which the UEs may transmit their first code. Different opportunities may be provided to different groups of UEs depending, for example, on the service agreement contracted with the end user, on the QoS required by one or more applications running on the UE, or on the current traffic load experienced by the eNB.

Opportunities to send subsequent codes are then provided by the eNB in one of two ways. This may be done through further or additional pre-configuration, providing a long term assignment of the resources to send the later codes, or through dynamic downlink signaling assigning resources on a short term basis only when required.

Codes of the sequence of codes may be sent in a sequence of durations where each code is sent in the corresponding iteration. In other words, a first code is sent in the first iteration, a second code is sent in the second iteration and so on.

An assigned opportunity may generally refer to an assignment of a unique resource, where the resource may be defined in a particular wireless system by a unit of frequency, time, code among others. In general, the resources to send the codes may be provided by the eNB, for example, using higher-layer Radio Resource Control (RRC) signaling to allocate one or more of the resources on a long term basis. Alternatively or in addition, the lower-layer Physical Downlink Control Channel (PDCCH) signaling may be used to allocate one or more of the resources on a short term or dynamic basis. Combinations of the two approaches are possible.

In some embodiments, eNBs will configure resources for the first code in a semi static manner, at the same time when the assignment of resources for other types of signaling to the UE is provided. For resources for one or more of the later codes however, the eNB may choose to allocate resources dynamically and subsequent SR resources are assigned for only for UEs that are associated with codes that were received in a previous iteration. This helps to maximize the efficiency of resources and improve flexibility of scheduling.

Opportunities for sending a sequence of codes may be provided to UEs semi-statically or dynamically. Further, different assignment methods may be used for different stages of a sequence. For example, first resource opportunities for transmission of a first code of the sequence of codes may be provided semi-statically while resource opportunities for transmission of subsequent codes of the sequence of codes may be provided dynamically through downlink signaling.

Alternatively, first resource opportunities for sending the first code of the sequence of codes may be provided semi-statically and resource opportunities for sending the second or other codes of the sequence of codes may also be provided semi-statically. In these solutions, there would be no need for additional downlink signaling.

In a further embodiment, other resource allocations are provided for UEs that do not have dedicated PUCCH SR opportunities. For example, RACH requests may be performed using a sequence of codes.

These three embodiments are described in detail below.

Sequential SR Resource Allocation with Downlink Signal

Instead of providing a unique code to the UE, which is pre-allocated at least once every latency duration, as is current done in LTE, in accordance with a first embodiment of the present disclosure, the eNB allocates the same first code to a group of UEs and allocates a minimal set of resources for all the UEs to send their first code in the first iteration.

Once a first code is received the eNB is able to determine that at least one of the UEs in the specific group that was assigned that particular first code wish to request resources. The eNB can then allocate further resources for that specific group of UEs to send their second code, while avoiding the allocation of resources for any group of UEs for which the eNB did not receive a first code.

For example, if the eNB receives codes a and c from a set of codes {a, b, c, d}, it will only allocate resources for UEs that are associated with codes a or c, while not allocating any resources for the UEs associated with codes b or d. Thus, in accordance with the first embodiment, only resources for the first code are pre-allocated in one example, while the resources for the second and subsequent codes can be allocated only when needed on a dynamic basis.

The process continues until all UEs that had sent the first code are identified at the eNB. In general, there may be n iterations, where n is equal to the length of the sequence of codes. Upon completion of the iterations, the UEs identify themselves uniquely to the eNB, without the need for contention resolution despite sharing the same first code.

For example, assume that a first UE is assigned the sequence {a,a} while a second UE is assigned the sequence {a,b} and a third UE is assigned a third sequence {b,a}. In the first stage UE1 and UE2 both send code a and UE3 sends code b in the pre-allocated first resource. For the second stage, having detected the transmission of codes a and b, the eNB dynamically allocates a second resource for resolving the requests from the UEs of group a and allocates a third resource for resolving requests from UEs of group b. However, if UE3 is the only member of group b, the eNB would not need to allocate the third resource since the UE3 is uniquely identified by code b in the first iteration.

When the UEs receive resource allocations for the second stage, the first UE sends code a and the second UE sends code b in the second resource and, if necessary, UE3 sends code a in the third resource.

Using this method, only the minimum of uplink resources are pre-allocated in the first stage, thus reducing the number of potentially unused and wasted resources while being able to support a potentially large number of UEs with low average activity. At the same time, when some UEs are requesting resources by sending their first code, the system is able to uniquely detect them in subsequent stages with less wasted resources since the allocation of resources for subsequent iterations are only applied when needed.

Further, requests for resources are provided within bounded delays because the contention resolution procedure is not required. As such, using a sequence of codes allows the system to support the SRs of many more UEs than is efficiently possible with current LTE configurations.

Figure 4:
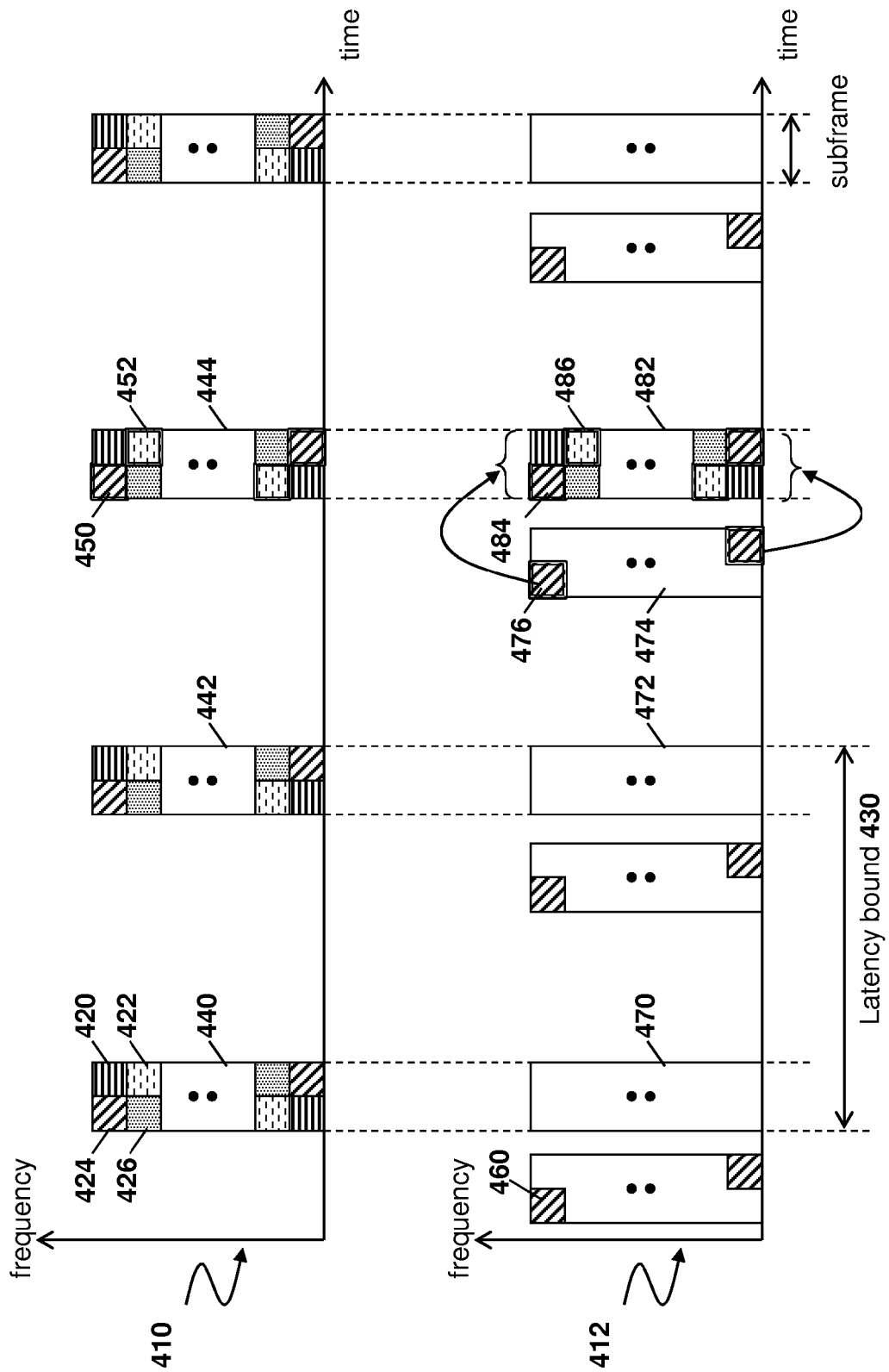
FIG. 4 is a block diagram showing scheduling request in accordance with one embodiment when compared to current LTE scheduling requests.

Reference is now made to FIG. 4. In FIG. 4 current LTE implementations are provided by arrow 410 while the embodiments described herein are provided by arrow 412. In particular, for current LTE embodiments, separate SR resources for code time and frequency are depicted by the two squares diagonally separated in the sub-frame that are allocated in individual UEs, shown generally by reference numerals 420, 422, 424 and 426. Each UE's allocation is depicted, and for simplicity and without a loss generality, other PUCCH allocation are ignored in the example of FIG. 4. Other parts of the subframe may be used for other purposes such as PUSCH.

The SR allocations are made, in the example of FIG. 4, in one subframe, which is repeated every latency bound number of sub-frames, the latency bound being depicted by arrow 430.

In the first two subframes, shown by subframes 440 and 442, no resource requests are made by a UE. In sub-frame 444, two UEs request sub-frames, shown by arrows 450 and 452.

As seen in the example of arrow 410, resources in the subframes are taken up by the uplink grant slots but these resources are wasted in subframes 440 and 442.

With regard to present embodiments, as shown by arrow 412, a sequence of codes example is provided and functions under the same circumstances as those for the example of arrow 410. However, all four UEs in this case are given the same initial SR resource.

Thus, in this case, only a single SR resource, depicted by reference numeral 460, is provided. The SR resource is provided in an earlier subframe since allocation of resources is done in subsequent subframes and the allocation should be performed before the latency bound is reached.

As with the previous LTE embodiment 410, the first two subframes have no SRs allocation requests and thus no SRs are received, as shown by sub-frames 470 and 472. However, unlike subframes 440 and 442, less resources are wasted and more resources can be used for PUSCH in sub-frames 470 and 472.

In subframe 474 at least one UE within the first group decides that it needs resource allocations. This is shown by arrow 476. Since the example is the same as that of the example 410, two UEs in fact need resources. In this case, the eNB receives the first code for resource allocations and the eNB allocates resources for all four UEs to send the second code, shown in sub-frame 482. In this case, resources for a first UE, shown by 484, and a second UE shown by reference numeral 486, are requested.

At this point, the two SRs are received by the eNB through the sequence of two codes instead of one but at the cost of fewer wasted resources overall.

In accordance with the above embodiment, the approach uses less resources for uplink signaling than periodic grant for all UEs. This is because on most occasions only the first stage is required if there is a low average activity and the first stage of the above uses less resources.

Where a request is detected at the first stage, more resources need to be allocated to determine exactly which UEs of the large set of UEs are requesting resources. As such, using the embodiments provided above, only a minimal set of resources are allocated to cover the large set of UEs within the tight latency bound, wherein the minimal set prevents wasted resources where there are no requests. Once requests are detected, a further selective set of resources are allocated.

Further, in cases where a large number of UEs exist, the resources may be allocated in specific stages. For example, the first allocation may have a fairly large subset which may then be allocated into subsequent smaller subsets. Thus, two or more stages may be required to resolve all of the UEs.

Further, receiving a code in the proposed approach also uses less resources than receiving a random access preamble, which is designed to be robust to unsynchronized UEs. In accordance with the embodiments described herein, the fact that the UEs are RRC-CONNECTED and synchronized to uplink timing are used to create a minimum amount of resources sufficient to convey only the presence of a request for resources as a unit of allocation. Further, many more UEs than random access methods may be supported where preambles are allocated to the UEs because the sequence of codes allows exponentially more UEs to be uniquely identified for each iteration used. For example, if there are k resources in each unit of allocation, and there are n iterations, it is possible to identify requests from up to $k^n$ UEs.

Sequential SR Using PUCCH Format 1

In one embodiment, the sequential SR may be sent through PUCCH Format 1 with little change in the MAC and RRC. In particular, the MAC may be modified adding one new RNTI and the RRC may be modified by adding a few new fields in the existing SR configuration. The physical layer can treat the new RNTI in the same fashion as the existing RA-RNTI.

Thus, the PUCCH Format 1 may be used to remain close to current SR procedures which also use PUCCH Format 1.

In the examples below, it is assumed that the UE uses the sequential SR procedure only when in the inactive part of a discontinuous reception (DRX) cycle, thus removing the need for ACK/NACK with SR and thus only PUCCH Format 1 resources are used for sequential SR.

In one embodiment, when the UE is not in DRX the UE may follow current SR procedures. However, in general, sequential request mechanisms can be used in parallel with one shot request mechanisms and are applicable to most uplink request scenarios. Alternatively, in some configurations the set of UEs that are expected to use the sequential SR procedures are not assigned any dedicated SR resources at all. In this case, the UE can omit sending the SR if there is an ACK/NACK that is expected from it in the same subframe.

Based on the above, a proposed RRC configuration for sequential SR is provided below with regard to Table 1.

TABLE 1

SchedulingRequestConfig Information Element

```
-- ASN1START
SchedulingRequestConfig ::=CHOICE {
    release                                NULL,
    setup                                  SEQUENCE {
        sr-PUCCH-ResourceIndex             INTEGER (0..2047),
        sr-ConfigIndex                     INTEGER (0..157),
        dsr-TransMax                       ENUMERATED {
                                               n4, n8, n16, n32, n64,
                                               spare3, spare2, spare1}
    }
}
SchedulingRequestConfig-v1020 ::= SEQUENCE {
    sr-PUCCH-ResourceIndexP1-r10           INTEGER (0..2047)
    OPTIONAL        -- Need OR
}
SchedulingRequestSequenceConfig ::=        CHOICE { OPTIONAL,-- Need OP
    release                                NULL,
    setup                                  SEQUENCE {
        sr-PUCCH-ResourceIndex0            INTEGER (0..2047),
        sr-ConfigIndex0                    INTEGER (0..157)
        sr-ResponseWindowSize              ENUMERATED {
                                               sf2, sf3, sf4, sf5, sf6, sf7,
                                               sf8, sf10},
        sr-ResponseWindowStart             ENUMERATED {
                                               sf0, sf2, sf4, sf8, sf16, sf32,
                                               sf64},
        SrSequenceList ::= SEQUENCE (SIZE (1..maxSrSequence)) OF
    SrResourceIndex OPTIONAL,-- Need OP
    }
}
SrResourceIndex                            INTEGER (0..127)
-- ASN1STOP
```

In LTE Release 8 and 9 standards, the UEs are sent a configuration indicating the PUCCH resource that is reserved for sending SRs in the SchedulingRequestConfig information element, specified in the 3GPP TS 36.331, *"Evolved Universal Terrestrial Radio Access (E-UTRA); Radio Resource Control (RRC); Protocol Specification"*, V.10.2.0, the contents of which are incorporated herein by reference.

The SchedulingRequestConfig information element indicates a subframe during which the resources are reserved for sending SRs as well as periodicity. In particular, periodicity is specified in the field sr-ConfigIndex.

The specific PUCCH resources are also provided in that subframe and are reserved for UEs in the sr-PUCCH-ResourceIndex. The sr-PUCCH-ResourceIndex indicates $n_{PUCCH,SRI}^{(1,\tilde{p})}$ which is mapped by the physical layer to a specific cyclic shift in the orthogonal cover code that the UE is expected to use in accordance with 3GPP TS 36.213. The PUCCH resources are indexed from 0 to 2047 in a given subframe, spanning several RBs, where only some of the maximum possible 2048 resources are allocated to the UEs in practice.

In order to implement the sequence of code schemes provided in accordance with the present disclosure, physical layer mechanisms and configuration of the PUCCH for sending SRs may be reused. The codes sent by the UEs in this case simply translate to the SR-PUCCH-ResourceIndex that are assigned to the UEs. Thus, the approach requires no change in physical layer in specifications.

In Release 8 and 9 LTE specifications, each UE has exactly 1 PUCCH resource reserved for the SR. In Release 10 LTE specifications, two antenna port configurations require the addition of an additional PUCCH resource for SR. The added resource was specified by sr-PUCCH-ResourceIndexP1-r10.

In a similar manner, sequential SR components may be added the SchedulingRequestConfig information element in accordance with Table 1 above. The additions to current SchedulingRequestConfig information elements are shown in bold in Table 1.

In particular, the sequential SR configuration may be provided to a UE whenever the SchedulingRequestConfig information element is sent or resent. The UE can use the sr-ConfigIndex0 when the UE is an inactive state of the DRX cycle in one embodiment. The fields of the RRC configuration are explained below.

The SchedulingRequestSequenceConfig information element provides for a sr-PUCCH-ResourceIndex0 and an sr-ConfigIndex0 to signal the first iteration of the sequential scheduling request. Similar to current SR configurations, the sr-PUCCH-ResourceIndex0 field specifies the first code (cyclic shift, spreading code and RB) that at UE uses to indicate that it needs resources in the uplink, whereas the sr-ConfigIndex0 specifies the subframe and periodicity of the resource in which the code may be sent. The difference between the current mechanisms is that, in the embodiment of Table 1 above, the eNB configures groups of UEs with the same set of resources for sending the first code.

In order to make allocations for the subsequent codes, a dynamic allocation mechanism may be used in order to have efficient use of PUCCH resources and allow the eNB scheduler maximum flexibility in allocation of resources. Further, an allocation mechanism that addresses several UEs and provides potentially different allocations for the UEs is provided. The mechanism may be low latency.

Under current LTE systems, a MAC Protocol Data Unit-Random Access Response (PDU-RAR) is used to indicate multiple allocations to multiple UEs in the same MAC PDU. The RAR PDU is described, for example, in TS 36.321 "*Evolved Universal Terrestrial Radio Access (E-UTRA); Medium Access Control (MAC) Protocol Specification; Protocol Specification*", V.10.2.0, in section 6.1.5. A similar MAC PDU may be provided for the purpose of indicating allocation for subsequent sequential SR iterations in the PUCCH. In one embodiment, the MAC PDU may be called the "Scheduling Request Response (SRR) MAC PDU.

In a similar manner to the RAR, a UE that has sent an SR in a previous sequential SR PUCCH resource monitors the PDCCH to look either for an uplink grant addressed to the UEs RNTI or for Scheduling Request Response RNTI (SRR-RNTI) within the SR Response Window that starts at n+sr-ResponseWindowStart and ends at n+sr-ResponseWindowStart+sr-ResponseWindowSize, where n is the subframe when resource for the previous sequential SR iteration were provided for the UE. The SRR-RNTI may be a common RNTI and could be as defined in Table 7.1-1 of 3GPP TS 36.321, for example.

An SRR MAC PDU may consist of a MAC header in one or more SRRs. An SRR may include an SR Sequence Number, an SR Resource Index Received and PUCCH Resource Index. The SR Sequence Number in the SRR is set to current iteration number (p) and the SRR is addressed to the UE that has been configured with an SRSequenceList, in which the $p^{th}$ SrResourceIndex value (denoted as SrResourceIndex(p)) is the same as indicated in the SRR field SR Resource Index Received.

For such UEs, the allocation of the next PUCCH Resource Index is: PUCCH Resource Index+SrSequenceList(p+1) and occurs in the subframe n+4, where n is a subframe where the SRR was received.

In a first iteration, when a UE uses the RRC configured PUCCH-ResourceIndex0, the value of p is considered to be 0 and the SRR sent by the eNB contains 0 in the SR Index Received Field. Further, for the k iterations configured by the RRC, the length of the list SRSequenceList is k−1 and the index into the list starts from 1.

Figure 5:
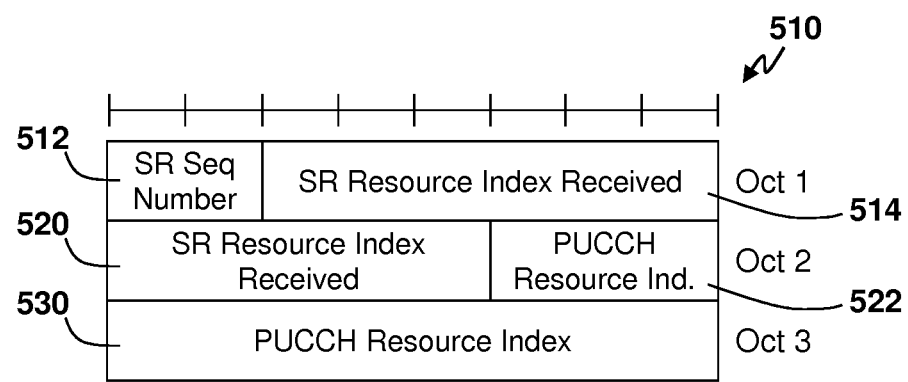
FIG. 5 is a block diagram of an SRR MAC PDU.

Reference is now made to FIG. 5, which illustrates an SRR that is sent in a MAC PDU. In particular, the SRR 510 includes 3 octets. In a first octet the SR sequence number 512 is provided along with the SR Resource Index Received value 514. In a second octet the SR Resource Index Received value 520 along with the PUCCH Resource Index 522 is provided. In the third octet, the PUCCH Resource Index 530 is provided.

Thus, the PUCCH Resource Index Field is interpreted by the UEs in the same ways the sr-PUCCH-ResourceIndex0 and the sr-PUCCH-ResourceIndex that is sent in the RRC, except that it is sent in a MAC message.

In a configuration for sequential SR by RRC in the SchedulingRequestSequenceConfig, the UE can determine its next opportunity to send the first part of the sequential SR whenever the allocation is available. Subsequent allocations for sequential SR are dynamically scheduled by the eNB by sending the SRR MAC PDU when needed. The SR is deemed to have been sent when the last SrResourceIndex of the SrSequenceList is sent. Similar to the RAR, SRR may benefit from HARQ retransmissions.

Figure 6:
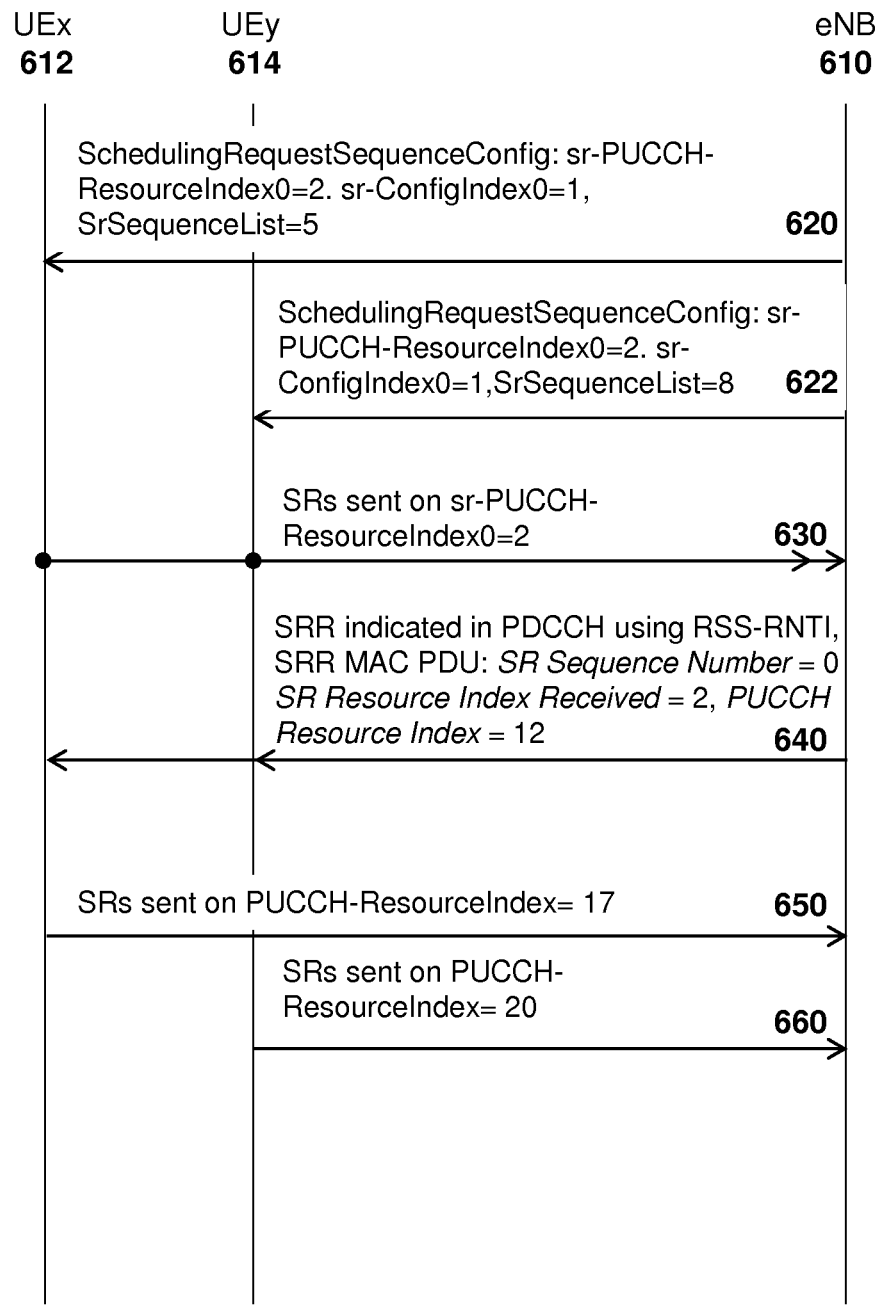
FIG. 6 is a flow diagram showing sequential scheduling request in accordance with one embodiment of the present disclosure.

Reference is now made to FIG. 6, which shows a sequential SR procedure. In particular eNB 610 communicates with a first UE 612 and a second UE 614.

In a first message 620, the eNB 610 sends the SchedulingRequestSequenceConfig to UE 612. In the configuration, the sr-PUCCH-ResourceIndex0 is specified to be 2, the sr-ConfigIndex0 is specified to be 1, and the SrSequenceList is specified to be 5.

Similarly, eNB 610 sends UE 614 a SchedulingRequestSequenceConfig message 622, in which the sr-PUCCH-ResourceIndex0 is equal to 2, the sr-ConfigIndex0 is 1 and the Sr-SequenceList is 8. Thus, in accordance with messages 620 and 622, both UEs have the same sr-PUCCH-ResourceIndex0 and sr-ConfigIndex0.

UEs 612 and 614 are then in DRX and require uplink resources. UE 612 sends a message 630 to eNB 610 at a subframe n corresponding to sr-ConfigIndex0=1. The message is sent on the sr-PUCCH-ResourceIndex0=2 resource. Similarly, UE 614 sends the SR at subframe n on sr-PUCCH-ResourceIndex=2.

The eNB, in response to receiving the uplink allocation request at messages 630, sends a message 640 on the SRR MAC PDU to indicate base PUCCH Resource Index. This indicates to the UEs which base PUCCH Resource should be used in the next iteration. Message 640 is sent on subframe n+sr-windowStart.

In message 650 UE 612 sends SRs on PUCCH Resource Index=17 at subframe n+sr-windowStart+4. This number is determined based on the original configuration where the SR sequence list was 5 added to the PUCCH Resource Index of 12.

Similarly, in message 660, UE 614 signals to eNB 614 on PUCCH Resource Index=20 at subframe n+sr-windowStart+4. The resource index is determined based on the PUCCH Resource Index of 12 plus the SR Sequence List=8 signalled to the UE 614 in message 640.

At this point, the eNB may thus provide uplink grants to the UEs.

Alternative Sequential SR Response MAC PDU for Better PUCCH Packing

In an alternative embodiment, the eNB needs to set aside PUCCH Format 1/1a/1b resources in order to accommodate HARQ ACK/NACK for dynamic allocations. The PUCCH resources used for HARQ of dynamic allocations are determined by a formula specified in Section 10.1.2.1 of 3GPP TS 36.213, which maps the control channel element (CCE) in which the PDCCH allocation was made to a corresponding PUCCH resource. Since only a few of the CCEs are used for the dynamic uplink allocations in a given subframe, Format 1 PUCCH resources may be sparsely used in many subframes.

Also, at the time that RRC configuration of existing periodic PUCCH resources is provided, it is unknown if during some subframes the UE was allocated a periodic Format 1 resource, the UE may also have to send an ACK/NACK for the dynamic allocation and ends up using an implicitly determined Format 1a resource to send both or may have a PUSCH allocation, in which case the UE will not use the PUCCH at all.

As such, for most subframes, the eNB is expected to have a several unused PUCCH resources that it may otherwise allocate. The sequential SR scheme as described herein can use these PUCCH resources dynamically, using a MAC PDU that is sent in advance of when the PUCCH allocation is expected to be used by the UEs, but after determining the other uplink transmissions that a UE is expected to make in that sub-frame.

Therefore, given an existing RRC allocated PUCCH resource allocation that does not change frequently, a MAC triggered dynamic adjustment to the use of the PUCCH resources may be employed to improve PUCCH efficiency.

Figure 7:
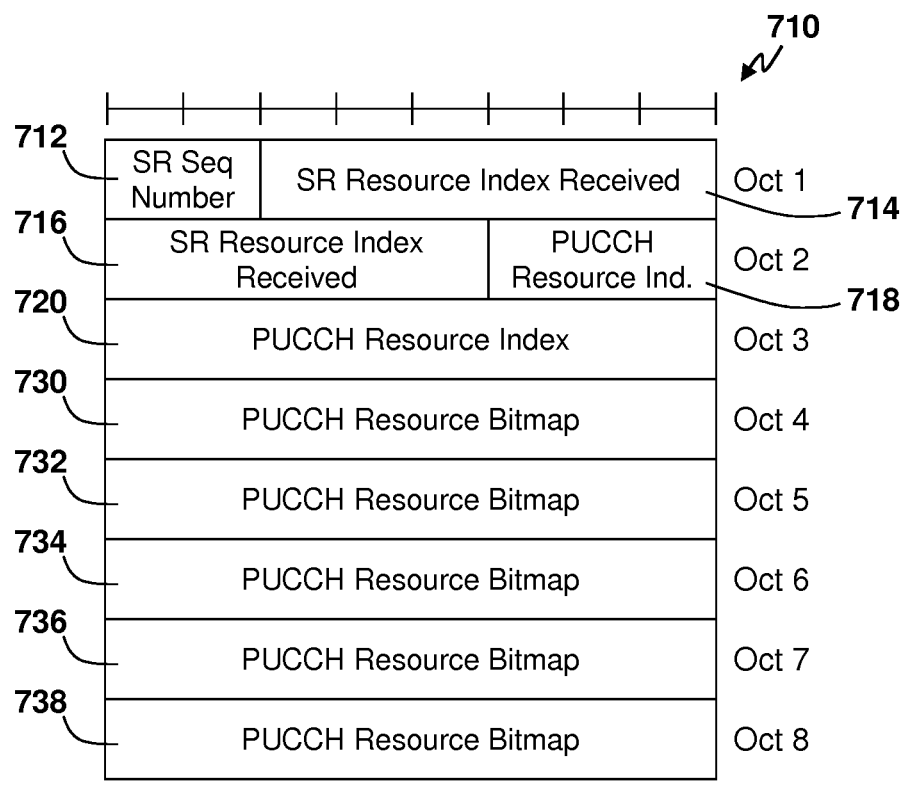
FIG. 7 is a block diagram of an SRR MAC PDU having resource bitmaps.

In particular, an alternative version of the SRR MAC PDU is shown with regard to FIG. 7, in which additional octets 4 to 8 are provided.

In particular, the SRR MAC PDU 710 includes an SR sequence number 712 and an SR resource index received value 714 in the first octet, an SR resource index received value 716 in the second octet as well as a PUCCH resource index 718 in the second octet.

Further, a PUCCH resource index 720 is provided in the third octet and PUCCH resource bitmaps 730, 732, 734, 736 and 738 are provided in octets 4 to 8 respectively.

The specific PUCCH resource that a UE is to use is determined by: PUCCH Resource Index+BitPosition(SrSequenceList(SR Sequence Number+1)), where the BitPosition function with an argument a returns the position of the $a^{th}$ set bit in the PUCCH resource bitmap.

The bitmap field allows the eNB to provide the dynamic PUCCH allocations economically by signaling that the UEs use the PUCCH resources that are known to be unused in the upcoming PUCCH occasion but may be scattered through all available PUCCH resources.

Alternative Configuration of Subsets of UEs with Different Iterations

In a further embodiment, the eNB may use mechanisms to selectively configure subsets of UEs with fewer or more iterations than other UEs. Specific strategies may be considered by the eNB where a subset of the UE population has fewer iterations to reduce the latency of sending an SR, while another subset of UEs may have more iterations because those UEs have a more relaxed latency requirement.

A priority set of UEs can be allocated a shorter sequence (SrSequenceList) than other UEs to allow faster scheduling requests than other UEs that have been allocated a longer SrSequenceList. For example, if the eNB configures the sequential SR with k PUCCH resources in each iteration, it may configure a priority set of UEs (u) to have an SrSequenceList of size one and the rest of the (k−u)×(k) UEs will have an SrSequenceList of size two. In this configuration the priority set of UEs can send SR in two iterations while the rest of the UEs require three.

Further, the mechanism of partitioning the sets of PUCCH resources and allowing additional iterations for a subset of those PUCCH resources can be extended recursively to multiple levels, where the number of UEs identifiable by the eNB at each iteration may be controlled by the eNB scheduler for flexibility. The higher priority sets may be related to the application running on the UE, the type of UE device, the type of account or user associated with the device, among other factors.

In other embodiments, UEs in different priority sets may be given resource groups of different sizes to have even better control of the timing and number of SRs that an eNB receives.

Alternative Timing of Iterations

In a further alternative, the specification of the timing of the next iteration may be advantageous when a time gap provided between iterations is used by the DRX UEs to conserve power. The interval between transmitting one iteration and the next iteration is specified by the sr-ResponseWindowStart and sr-ResponseWindowSize. Alternatives to the semi-static RRC configuration of the windows described above may be that the specification is set to a fixed value in the standard or provided dynamically for each iteration of the SRR MAC PDU. The latter will allow the eNB scheduler more flexibility to provide resources when appropriate and allows a UE to conserve battery power before the next iteration starts, while the former reduces the RRC/MAC signaling required.

New PUCCH Format

In a further alternative, instead of the use of existing physical layer resources, future releases of LTE may provide for a new PUCCH format.

In such a format, an introduction of physical layer changes may be made to allow new PUCCH formats that may be tailored to the sequence of codes mechanism. With UEs in DRX, there is little reason to send a reference signal as this is done in LTE PUCCH Format 1. This is because the low activity UEs are not actively sending data and thus maintaining up-to-date channel conditions for low activity UEs may be unnecessary. When the RS symbols are not required, the structure of a Format 1 PUCCH may be altered to suit the purpose of identifying UEs that wish to request service. Without the distinct RS and data symbols, the number of resource elements available per slot is 84. As such, a modified form of PUCCH Format 1 may be used where all the resource elements are used for sending the sequence of codes. In this case, even more orthogonal codes are possible, allowing the possibility of supporting more UEs per iteration of PUCCH Format 1 allocation.

In one example, the base sequence of length 12 is defined for PUCCH Format 1, as described in Section 2 of 3GPP TS 36.211, and the base sequence may be replaced with a new sequence designed with the aim of identifying UEs. For instance, available resource elements could be used to carry a chosen Zhadoff-Chu/Constant Amplitude Zero Auto-Correlation (ZC/CAZAC) sequence; smaller versions of ones used in RACH. The number of sequences and the length of such sequences may be designed to consider the number of UEs to be supported by the new PUCCH format, the error rate permissible and the latency of the mechanism. As an example, if a code length of q=84 was allocated to a UE and 42 distinct codes were created that are allocated to low activity UEs, the scheme of sending multiple codes in the same subframe could accommodate $42^2$=1764 UEs in two iterations.

Sequential SR Resource Configuration

In a further embodiment, alternative to dynamic allocation for subsequent iterations is a pre-configured allocation. That is, in one embodiment the eNB may pre-configure resources for all iterations.

One advantage of such an embodiment is the elimination of downlink signaling to the UEs for subsequent iterations. However, efficient packing and reuse of PUCCH resources possible with the embodiments described above are no longer provided for a pre-configured resource distribution.

In one embodiment, RRC signaling to set up the SR is extended to provide SR resource allocations for all iterations along with a SR sequence list. The modified RRC message is shown below with regard to Table 2, where the eNB is able to provide allocations for iterations of sequential SR procedures.

second iteration, but may subsequently re-allocate part or all of the SR resources for the second iteration upon identifying the absence of a particular transmission during the first iteration. The re-allocation may be achieved by the eNB sending uplink assignments via dynamic PDCCH signaling on the downlink to other users for the purposes of their uplink transmissions, such as for PUSCH.

Figure 8:
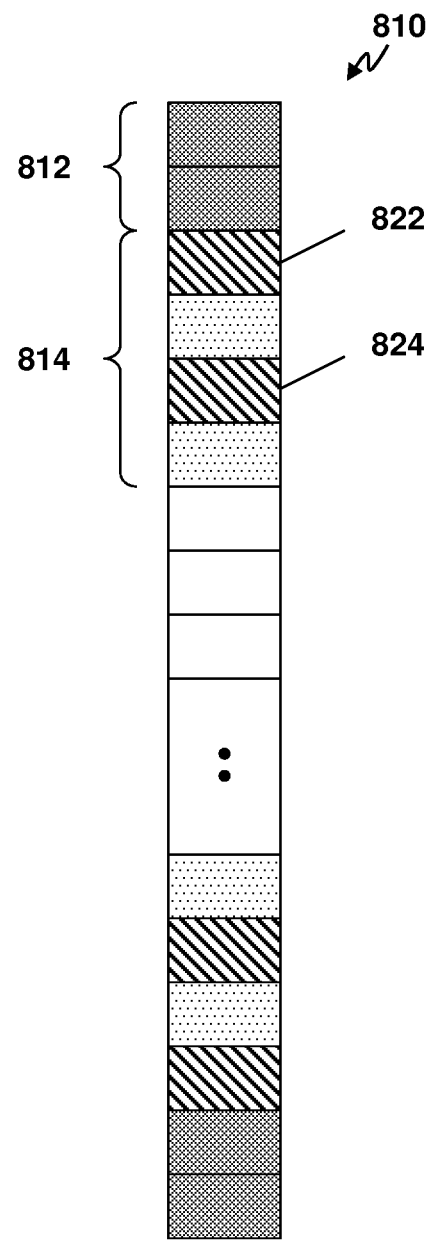
FIG. 8 is a block diagram of a preconfigured sequential scheduling request.

Reference is now made to FIG. 8. In FIG. 8, the uplink RBs of a subframe are represented by an array of rectangles 810 showing semi-static preconfiguration of resources in a particular subframe, with the actual usage of the resources in that subframe based on a previous iteration where SRs received by the eNB.

In the embodiment of FIG. 8, PUCCH allocations 812 have configured SRR allocations 814 for later rounds.

In particular, SRR allocations 822 and 824 are actual allocations based on SRs received in a previous iteration, whereas the remaining SR allocations can be reused for other purposes. For example, the remaining resources, since not configured for SRR, can be used for PUSCH for other UEs.

When the UEs are configured by the eNB to use the subsequent SR, the eNB indicates that specific resources can be used. The resources are all the resources that have been configured to be used for the second iteration of the sequential SR for that particular subframe. This configuration is semi-statically configured by the RRC message. After the first iteration of sequential SR procedures, the eNB is able to detect that some of the UEs configured with the sequential SR resources have sent their first code and will thus require the use of the resources configured for the latter iteration. The eNB will set aside these resources and the UEs will send the second code

TABLE 2

SchedulingRequestConfig Information Element

```
-- ASN1START
SchedulingRequestConfig ::=    CHOICE{
    release                     NULL,
    setup                       SEQUENCE {
        sr-PUCCH-ResourceIndex       INTEGER (0..2047),
        sr-ConfigIndex               INTEGER (0..157),
        dsr-TransMax                 ENUMERATED {
                                        n4, n8, n16, n32, n64,
                                        spare3, spare2, spare1}
    }
}
SchedulingRequestConfig-v1020 ::= SEQUENCE {
    sr-PUCCH-ResourceIndexP1-r10    INTEGER (0..2047)
    OPTIONAL       -- Need OR
}
SchedulingRequestSequenceConfig ::= CHOICE {   OPTIONAL,-- Need OP
    release                     NULL,
    setup                       SEQUENCE {
        SrSequenceList ::=       SEQUENCE (SIZE
(1..maxSrSequence)) OF SrResourceIndex OPTIONAL,-- Need OP
    }
}
SrResourceIndex                ::=        SEQUENCE {
    sr-PUCCH-ResourceIndex       INTEGER (0..2047),
    sr-ConfigIndex               INTEGER (0..157)
}
-- ASN1STOP
```

As seen in Table 2 above, the new parts of the scheduling request information element are shown in bold.

After receiving codes at an iteration, the eNB need only actually reserve the resources for those configured allocations for which it received the previous code. The eNB can schedule the use of the remainder of the configured resources for any other purpose in a dynamic manner. For example, the eNB may pre-allocate SR resources for both a first and a second iteration, but may subsequently re-allocate part or all in those resources. The remainder of the configured resources are available to be used dynamically by the eNB.

Random Access Using Sequence of Codes

In a further embodiment, LTE allows UEs that do not have upcoming uplink grants to use the RACH channel. Sporadic uplink traffic from a large number of UEs, may be suited for random access. However such application of RACH would mean that the system would have to deal with a much larger number of bursty random accesses. In the present disclosure, resources may be thought of as random access (RA) preambles and the terms "resources" and "preambles" are used interchangeably.

The properties of the embodiments of FIGS. 4 to 8 can also be used for minimizing the number of dedicated RACH radio resources in supporting large number of RACH users in a contention mode, contention free mode or both.

While the present disclosure described Random Access for an LTE system, the embodiments described herein could equally apply to accessing any network at random. For example, the present disclosure could be applied to the Institute for Electrical and Electronics Engineers (IEEE) 802.11x (WiFi) systems, among others.

In some embodiments, for each iteration a UE randomly picks preambles from a set made available by the eNB, which in turn replies with random access response messaging, containing a new allocation of preambles for the next iteration for each preamble received. Iterations continue until the eNB is satisfied that the resulting probability of collisions across all iterations is sufficiently small.

In other embodiments, the UEs are provided with an indication of relative ordering and grouping in each iteration, while the eNB allocates preambles for each iteration that map the UE order in group to a set of preambles and provides information about the actual preambles available for each round. Preambles in additional PRACH slots are only actually allocated by the eNB if a corresponding preamble is received in the previous iteration.

Based on the above, random preambles may be provided in sequence. Specifically, obtaining low collision probability in random access with a large number of users means that resources for random access are provisioned for low utilization. This is because current random access mechanisms are optimal when exactly one user accesses a resource, such as a preamble in the case of LTE RACH. If no user selects a preamble it ends up being wasted, whereas when more than one user selects a preamble, the users are required to perform back-off and retry, which requires more preambles and may result in wasted preambles. In general, for the case of m RACH preambles per unit time and k UEs trying to RACH in that unit of time, the probability of no collisions is provided below with regard to equation 1.

$$P[\text{no collisions with } m, \text{ resources and } k \ UEs] = \frac{\left(\frac{m!}{(m-k)!}\right)}{m^k} \quad (1)$$

In LTE, the collision probability of RACH channel is provisioned such as that there is no more than a one percent probability of collision on average. If we consider the case of two UEs sending RACH requests from the formula above the eNB needs to provision an average of at least one hundred RACH resources on average to ensure the probability of collisions is no more than one percent. This is a very low utilization.

Obtaining a low probability of collision may be achievable without low utilization if the random access is reformed across multiple iterations, where each iteration builds on the previous iteration in a manner that resources are allocated selectively and progressively. Specifically, the iteration may selectively be based on a previous iteration and progressively based where more resources are allocated for each used resource in the previous iteration up to a point that the required probability of one user using a resource is achieved.

In the present embodiment, in a single iteration the probability of collision may be higher than the target collision probability but overall the target collision probability is designed to be met after multiple iterations.

As opposed to the current use of the random access, a small set of random access preambles $\{p_{00}^0, p_{01}^0, p_{02}^0, p_{03}^0, \ldots, p_{0m}^0\}$ are allocated for the first iteration of random access in sequence. A UE picks then sends a preamble, say $p_{0i}^0$ at random from that set. The eNB responds with an allocation of more preambles and, optionally more PRACH resources, for each of the preambles it detects. For each $p_{0i}^0$ the eNB allocates a set $\{p_{i0}^1, p_{i1}^1, p_{i2}^1, \ldots, p_{im}^1\}$. All the UEs that had picked a particular preamble $p_{0i}^0$, now pick and send one of the preambles from the new set of preambles allocated to them $\{p_{i0}^1, p_{i1}^1, p_{i2}^1, \ldots, p_{in}^1\}$. This process continues until the time the eNB achieves the required probability of collision. The preamble notation denotes the iteration for which the preamble is available in superscript, while it denotes the preamble chosen in previous round and the preamble number in the current round respectively, in the subscript.

For example, with 2 UEs trying to RACH, the probability of no collisions can be calculated in an iteration if the number of preambles allocated for that iteration is $$m = \frac{\left(\frac{m!}{(m-2)!}\right)}{m^2}.$$

If subscripts of $m_0$ and $m_1$ denote the preambles in iterations 0 and 1, the probability of no collision can be derived from the above formula and denoted as $p_0$ and $p_1$ respectively.

The only way that there will be an eventual collision is if the 2 UEs picked the same preamble in the first iteration to begin with, which has a probability=$1-p_0$. Further collision only occurs if the 2 UEs pick the same resource in the first step and the second step, which gives us:

$$P[\text{collisions after 2 iterations}]=(1-p_0)*(1-p_1) \quad (2)$$

If for example 10 resources are allocated in each iteration, i.e. $m_0=m_1=10$, the probability of collision after two iterations is $=0.01$.

The average number of preambles used for that outcome may be calculated as equal to:

$$P[\text{no collision in the first round}]\times(m_0+m_1+m_1)+P[\text{collision in the first round}]\times(m_0+m_1)=0.9\times30+0.1\times20=29. \quad (3)$$

So the number of preambles and associated radio resources that is required to be allocated with two steps (29) is much less than 1 step (100) for the same collision probability of (0.01).

Figure 9:
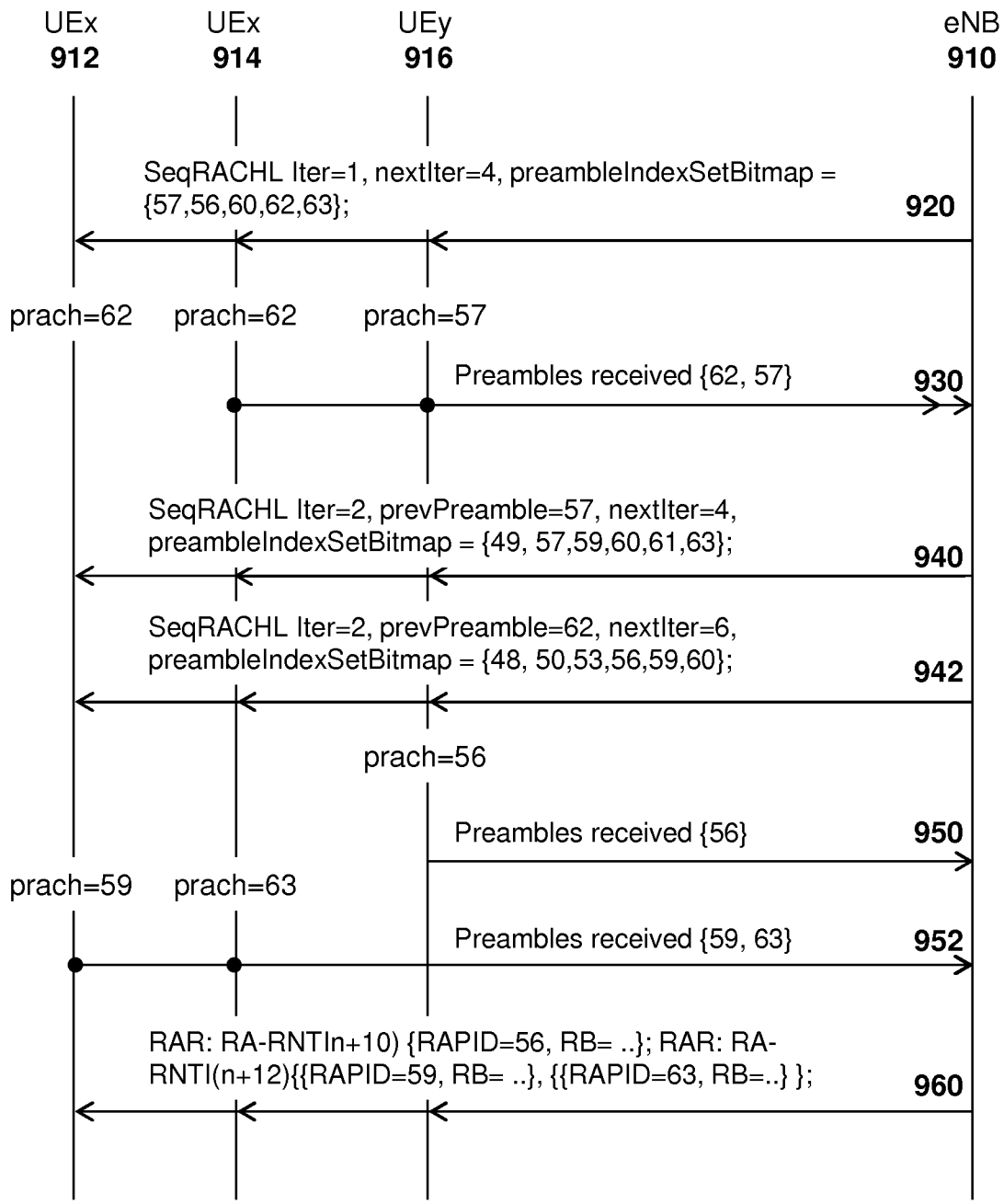
FIG. 9 is a flow diagram showing sequential RACH in accordance with one embodiment of the present disclosure.

Reference is now made to FIG. 9. In FIG. 9 eNB 1210 communicates with UEs 912, 914 and 916 that want to access the same send RACH at the same time.

In the example of FIG. 9 the eNB provides preambles for each round, in order to maximize its use of the set of reserved preambles (which may be shared with HO and RACH order)

In particular, at subframe number n, a message 920 is sent and received by all the UEs and includes a preamble index set bitmap with enumerated values.

The eNB responds at n+6 with a new set of preambles for the UE(s) that had transmitted the preamble 57, indicating that it expects the next iteration to occur after 4 subframes, at n+10, picking the preambles that it knows will not be used at n+10. It sends a similar message for the UE(s) that had sent preamble 62, indicating that the next iteration for those UEs is to occur at n+12. In this example, after 2 iterations the eNB provides grants to the three preambles in a RAR message based on the subframe that the last preamble was received.

UEs 912, 914 and 916 randomly pick a preamble and send a message to the eNB after a predetermined interval (4 in the example of FIG. 9), utilizing the chosen preamble. This is shown with arrow 930.

As seen in FIG. 9, at arrow 930 both UE 912 and UE 914 picked the PRACH preamble 62, while UE 916 picked PRACH preamble 57.

In this case, the eNB 910 received preambles 62 and 57 and at subframe n+6 sends a message 940 to all of the UEs indicating that for the previous preamble "57", the next iteration is 4 and sets the preamble index set bitmap.

Further, a message 942 is sent at subframe n+8 for the preamble "62" indicating the next iteration is 6 and the preambles index bitmap is set. The two preamble index set bitmaps are different between messages 940 and 942.

UEs 912 and 914 pick a preamble from the set provided in message 942 and UE 916 picks a preamble from the set provided at message 940. UE 916 sends the chosen preamble at subframe n+10 (the offset being applied from message 940), shown by message 950.

In the example of FIG. 9, UEs 912 and 914 each pick a different preamble, shown by PRACH 59 and PRACH 63 and send a preamble with message 952 at subframe n+12.

Thus the eNB 900 is able to detect all the pre RACH preambles.

The eNB then provides grants for the preambles and sends the RNTIs to the 3 UEs, shown by message 960.

Figure 10:
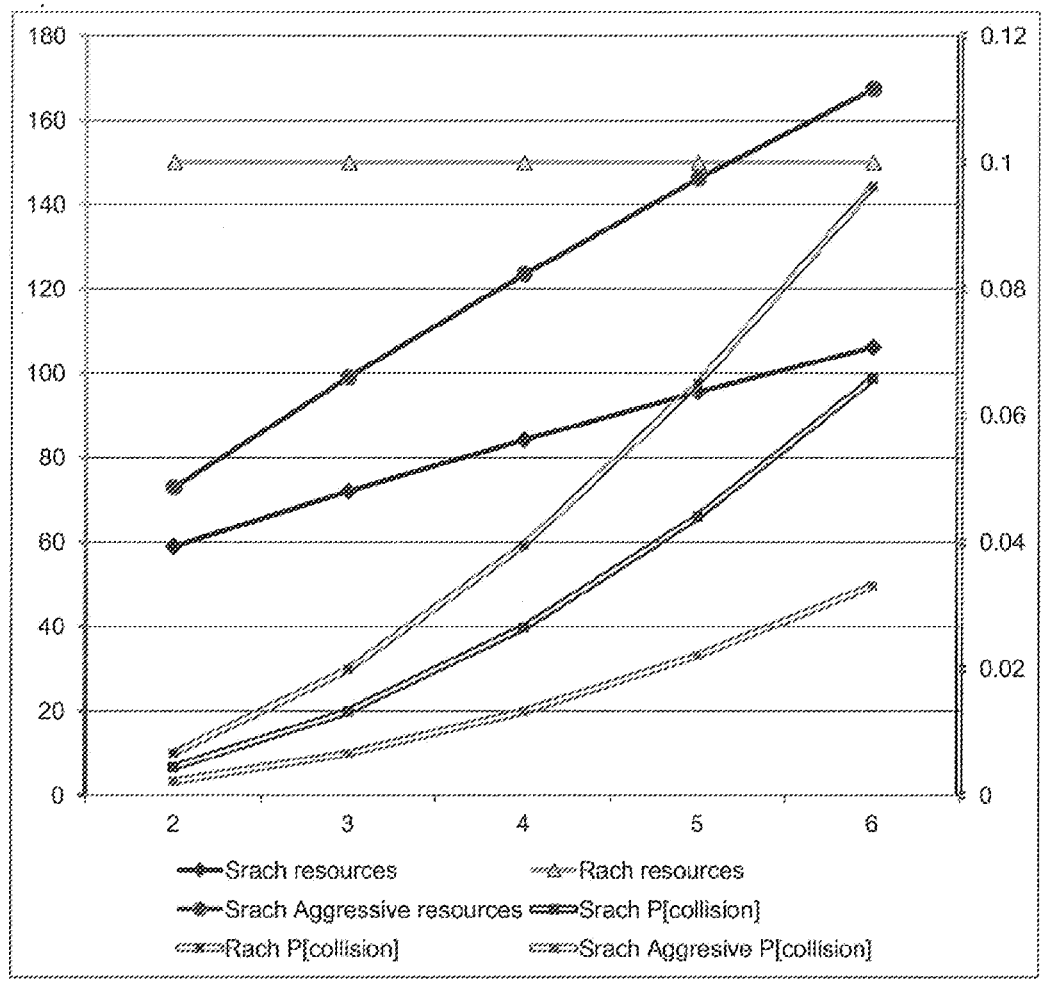
FIG. 10 is a plot showing performance of sequential RACH versus RACH.

The performance of a sequential RA scheme depends on the number of UEs that perform the RA at the given instance. The more UEs that attempt to access the same RA opportunity, the more resource sequential RAs that may be needed. However, due to the adaptive nature of the sequential RA, the probability of collision will also be lower. Referring to FIG. 10, the figure shows a plot for the number of preamble uses on the Y axis on the left and the probability of collision on the right. Horizontal axis of FIG. 10 shows the number of simultaneous UE RAs.

From FIG. 10, the performance in terms of probability of collision (shown in double lines) of the embodiments described herein is better than the current mechanism, at the same time the number of preambles and therefore RACH resources used is lower. Further the two variants of the present embodiments show the flexibility that the eNBs have to trade off more resources when a large burst of RAs is suspected.

Allocated Preambles in Sequence

Allocated preambles allow UEs that are already known to the eNB to avoid contention. In order to scale beyond the limited number of RACH resources that can be allocated in current LTE architectures, UEs can be assigned multiple preambles that are to be sent in sequence, one preamble at a time in each iteration.

In one embodiment each UE has a unique sequence of preambles, but individual preambles in the sequence may be shared by more than one UE. The first preamble of the sequence can be viewed as the most significant preamble, while the last preamble can be seen as the least significant preamble identifying the UE. The resources for the first preamble are allocated in advance in possibly in a recurring manner. For efficiency, the eNBs only allocate resources for sending the later preambles when it receives the earlier preamble.

In some embodiments the UEs are given unique UE numbers that indicate which preamble is to be used in an iteration. In some embodiments the eNB provides an indication of the preambles to be used for an upcoming iteration (including, for example, a bitmask of available preambles, or the starting preamble number of a set of preambles) and a unique UE number is used to derive the exact preamble to be used by a UE.

Further, in current LTE architectures, an eNB may reserve some RACH preambles to be used for the allocated mode, e.g. for handoff. In order to support the sequential RA, the eNB could allocate a subset of reserved preambles as preambles for sequential RA. The UEs with sporadic traffic are allocated a unique sequence of preambles, starting with the first preamble from the reserved set of preambles. Reserving a small set of preambles may be beneficial because the sporadic activity UEs may not compete with other random access applications and may not consume a large number of RA resources.

More than one UE will receive the same preamble as the first preamble in the sequence of preambles. When preambles from the reserved subset are received the eNB may signal the UEs to use another set of preambles. The preambles for this iteration may be economically allocated by either using preambles that will not be used in that subframe, or allocating a RACH resource set with new preambles to match the number of new preambles needed for the iteration. The process may continue until the eNB has received the last preamble from the UEs that were attempting RA.

Overall, at the cost of a slight increase in latency, fewer RACH resources may be used to support a larger number of UEs that are registered with the eNB but have sporadic uplink traffic.

Random or Seeded Selection of Sequence of Preambles

In some embodiments, the UE uses a sequence of preambles chosen from a set of sequences that have been predefined in a standards document, or provided through eNB configuration. The selection of a sequence to use may be random or it may be based, in whole or in part, on information shared between the UE and the eNB such as a UE identifier. Each sequence in the set defines a sequence of preambles to be sent sequentially, one preamble per iteration as needed. As described above, the preambles associated with these sequences can be reserved from a set of RACH sequences, or a new RACH resource may be allocated for this purpose.

In one embodiment, in the case of a randomly selected sequence of preambles, or a sequence of preambles only based on part of the unique UE identifier, the UE may need to send an identifier to the eNB after preamble disambiguation to positively identify itself to the eNB and the network.

Coded Sequence of Preambles to Add Robustness to the Detection of Codes

In some embodiments where a sequence of preambles is allocated to or selected by a UE, the sequence of preambles is chosen to maximize the probability of a successful decoding of the preamble by the eNB after each iteration. In these embodiments, a coding technique designated for use by both the UE and eNB, such as block coding, convolution coding, or turbo coding, is applied to the sequences of preambles used by the UEs. The technique may then be applied to the decoding procedure and decision metric of the eNB.

In one embodiment, where the UE randomly selects a sequence of preambles, the UE generates a random bit string where the length of the bit string, L, corresponds to the maximum number of iterations. The bit string is the effective identifier for the sequence of preambles to be used by the UE. The bit string is then encoded according to the designated 1/N coding technique. The output code bits are then be mapped to preambles for each iteration. For example, if there are 64 preambles total, and the code rate of a selected block encoder is 1/6, each bit of the bit string can be used to generate a 6-bit output code; the output code can then be mapped to one of the 64 preambles. In an alternate embodiment, an encoder with code rate R can be used, and the output of the encoder can be arranged into groups of P bits to select one of the $2^P$ preambles in the set of preambles for each iteration.

In some embodiments where the eNB defines the set of preamble sequences, and the UE selects a sequence from that set, the set of preamble sequences may be derived using a coding method, as described. In some variants of the embodiments where the eNB defines the set of preamble sequences, the eNB may select a sequence for a UE from that set and indicate the selection to the UE for use in future signaling opportunities. In at least one of these embodiments, the eNB indicates the sequence of preambles to use by signaling the bit string input to the encoder designated for use by the eNB and UE. In yet another variant of this embodiment, the eNB also signals the encoder, or the rate, or both, to be used by the UE.

For example, consider a set of 4 preambles from which sequences of preambles are selected. If any sequence of the four preambles is allowed, there may be two UEs that send the exact same preamble sequence differing only on one iteration. Such sending may not lead to a particularly strong differentiator of the two sequences, in case of errors at the receiver. In addition, in one or more iterations, a preamble sent by one or more UEs may be missed due to noise or interference. Encoding and decoding via block codes, convolutional codes, or turbo codes can increase the probability of correctly determining the sequence at the eNB. The sequence of preambles is generated by applying the input bit string to a known encoder, and mapping the output bits or sets of output bits to available preambles as described previously. Encoding and decoding via block codes, convolutional codes, and turbo codes, from a sequence of input bits is known to those in the art.

For example, a K=3, rate ½ (7,5) convolutional code may be applied to a system with 4 preambles {P0, P1, P2, P3} to derive easily separable sequences of preambles for each iteration.

In one example, the state transition and encoding tables are given by:
Next State, if

TABLE 3

State Transition and Encoding Table

| Current State | Input = 0: | Input = 1: |
|---|---|---|
| 00 | 00 | 10 |
| 01 | 00 | 10 |
| 10 | 01 | 11 |
| 11 | 01 | 11 |

TABLE 4

State Transition and Encoding Table

| Current State | Input = 0: | Input = 1: |
|---|---|---|
| 00 | 00 | 11 |
| 01 | 11 | 00 |
| 10 | 10 | 01 |
| 11 | 01 | 10 |

Output Symbols, if

If each preamble is represented by a binary pair (00, 01, 10, 11), then the above tables may be used to derive codewords based on an input bit string. The bit strings may be chosen randomly, or based on the UE identifier, or other stimuli.

For example, if UE-1 selects the bit string 10011 with initial register state "00", the resulting output code bits are:

TABLE 5

Resulting Output Code Bits

| State | Input | Output | Preamble |
|---|---|---|---|
| 00 | 1 | 11 | P3 |
| 10 | 0 | 10 | P2 |
| 01 | 0 | 11 | P3 |
| 10 | 1 | 01 | P1 |
| 11 | 1 | 10 | P2 |

Similarly, if UE-2 selects the bit string 11001, the resulting preamble sequence will be (P3, P1, P1, P3, P3). The distance between the unencoded bit strings 10011 and 11001 is 2, however the distance between the encoded sequences (P3, P2, P3, P1, P2) and (P3, P1, P1, P3, P3) is four. In some embodiments, the sequence of preambles may be repeated if the number of iterations exceeds the sequences length produced by the coding process. In some embodiments the initial state of the encoder may be predetermined, or in still other cases, the initial state may be defined by a set of bits at the beginning of the bit string.

At the receiving eNB, following each transmission the eNB can use well-known decoding methods, such as trellis decoding or other schemes, to attempt to determine the preamble, or sequences of preambles, that have been transmitted by one or more UEs. During decoding, the confidence of the determined preamble or sequence of preambles within one of the known sequences, which can be represented as log-likelihood ratio, extrinsic information, or otherwise, can be a threshold for the eNB to determine whether further iterations are needed to separate UEs (i.e. preamble sequences), or whether there is sufficient confidence that the all UE transmissions have been uniquely identified.

The above may be implemented by any network element. A simplified network element is shown with regard to FIG. 11.

Figure 11:
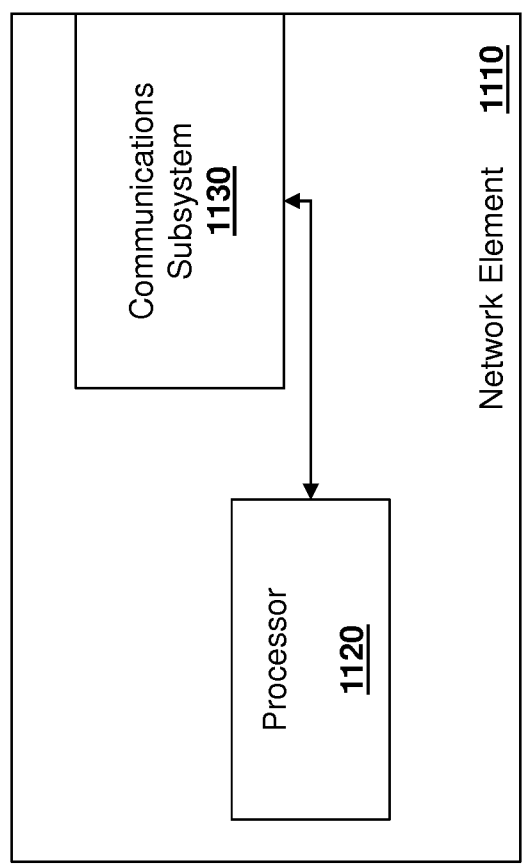
FIG. 11 is a block diagram of a simplified example network element.

In FIG. 11, network element 1110 includes a processor 1410 and a communications subsystem 1130, where the processor 1120 and communications subsystem 1130 cooperate to perform the methods described above.

Further, the above may be implemented by any UE. One exemplary device is described below with regard to FIG. 12.

UE 1200 is typically a two-way wireless communication device having voice and data communication capabilities. UE 1200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1200 is enabled for two-way communication, it may incorporate a communication subsystem 1211, including both a receiver 1212 and a transmitter 1214, as well as associated components such as one or more antenna elements 1216 and 1218, local oscillators (LOs) 1213, and a processing module such as a digital signal processor (DSP) 1220. As will be apparent to those skilled in the field of communications, the particular design of the communication subsystem 1211 will be dependent upon the communication network in which the device is intended to operate. The radio frequency front end of communication subsystem 1211 can be any of the embodiments described above.

Network access requirements will also vary depending upon the type of network 1219. In some networks network access is associated with a subscriber or user of UE 1200. A UE may require a removable user identity module (RUIM) or a subscriber identity module (SIM) card in order to operate on a network. The SIM/RUIM interface 1244 is normally similar to a card-slot into which a SIM/RUIM card can be inserted and ejected. The SIM/RUIM card can have memory and hold many key configurations 1251, and other information 1253 such as identification, and subscriber related information.

Figure 12:
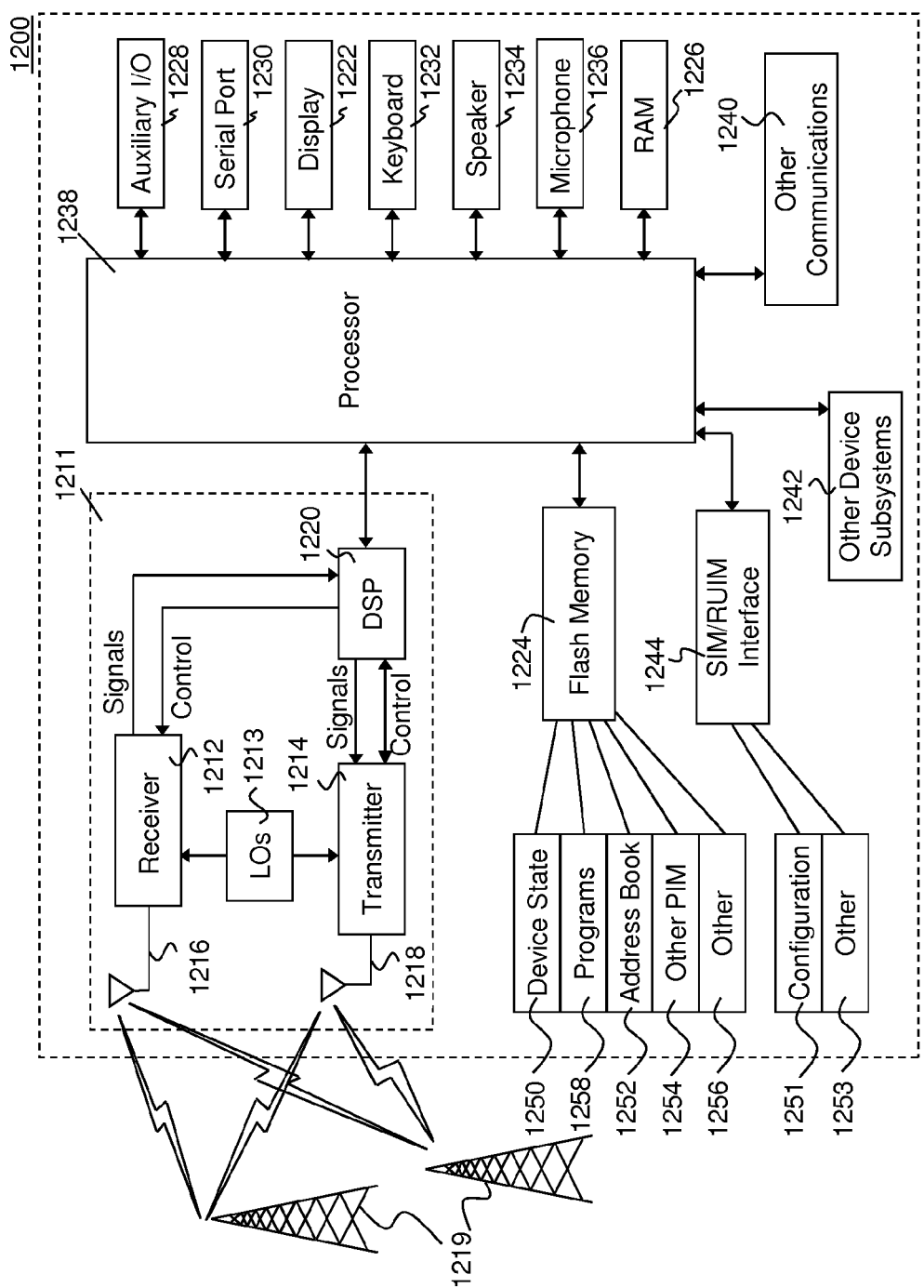
FIG. 12 is a block diagram of an example user equipment.

When required network registration or activation procedures have been completed, UE 1200 may send and receive communication signals over the network 1219. As illustrated in FIG. 12, network 1219 can consist of multiple base stations communicating with the UE.

UE 1200 generally includes a processor 1238 which controls the overall operation of the device. Communication functions, including data and voice communications, are performed through communication subsystem 1211. Processor 1238 also interacts with further device subsystems such as the display 1222, flash memory 1224, random access memory (RAM) 1226, auxiliary input/output (I/O) subsystems 1228, serial port 1230, one or more keyboards or keypads 1232, speaker 1234, microphone 1236, other communication subsystem 1240 such as a short-range communications subsystem and any other device subsystems generally designated as 1242. Serial port 1230 could include a USB port or other port known to those in the art.

Some of the subsystems shown in FIG. 12 perform communication-related functions, whereas other subsystems may provide "resident" or on-device functions. Notably, some subsystems, such as keyboard 1232 and display 1222, for example, may be used for both communication-related functions, such as entering a text message for transmission over a communication network, and device-resident functions such as a calculator or task list.

Operating system software used by the processor 1238 may be stored in a persistent store such as flash memory 1224, which may instead be a read-only memory (ROM) or similar storage element (not shown). Those skilled in the art will appreciate that the operating system, specific device applications, or parts thereof, may be temporarily loaded into a volatile memory such as RAM 1226. Received communication signals may also be stored in RAM 1226.

As shown, flash memory 1224 can be segregated into different areas for both computer programs 1258 and program data storage 1250, 1252, 1254 and 1256. These different storage types indicate that each program can allocate a portion of flash memory 1224 for their own data storage requirements. Processor 1238, in addition to its operating system functions, may enable execution of software applications on the UE. A predetermined set of applications that control basic operations, including at least data and voice communication applications for example, will normally be installed on UE 1200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1219. Further applications may also be loaded onto the UE 1200 through the network 1219, an auxiliary I/O subsystem 1228, serial port 1230, short-range communications subsystem 1240 or any other suitable subsystem 1242, and installed by a user in the RAM 1226 or a non-volatile store (not shown) for execution by the processor 1238. Such flexibility in application installation increases the functionality of the device and may provide enhanced on-device functions, communication-related functions, or both. For example, secure communication applications may enable electronic commerce functions and other such financial transactions to be performed using the UE 1200.

In a data communication mode, a received signal such as a text message or web page download will be processed by the communication subsystem 1211 and input to the processor 1238, which may further process the received signal for output to the display 1222, or alternatively to an auxiliary I/O device 1228.

A user of UE 1200 may also compose data items such as email messages for example, using the keyboard 1232, which may be a complete alphanumeric keyboard or telephone-type keypad, among others, in conjunction with the display 1222 and possibly an auxiliary I/O device 1228. Such composed items may then be transmitted over a communication network through the communication subsystem 1211.

For voice communications, overall operation of UE 1200 is similar, except that received signals would typically be output to a speaker 1234 and signals for transmission would be generated by a microphone 1236. Alternative voice or audio I/O subsystems, such as a voice message recording subsystem, may also be implemented on UE 12200. Although voice or audio signal output is generally accomplished primarily through the speaker 1234, display 1222 may also be used to provide an indication of the identity of a calling party, the duration of a voice call, or other voice call related information for example.

Serial port 1230 in FIG. 12 would normally be implemented in a personal digital assistant (PDA)-type UE for which synchronization with a user's desktop computer (not shown) may be desirable, but is an optional device component. Such a port 1230 would enable a user to set preferences through an external device or software application and would extend the capabilities of UE 1200 by providing for information or software downloads to UE 1200 other than through a wireless communication network. The alternate download path may for example be used to load an encryption key onto the device through a direct and thus reliable and trusted connection to thereby enable secure device communication. As will be appreciated by those skilled in the art, serial port 1230 can further be used to connect the UE to a computer to act as a modem.

Other communications subsystems 1240, such as a short-range communications subsystem, is a further optional component which may provide for communication between UE 1200 and different systems or devices, which need not necessarily be similar devices. For example, the subsystem 1240 may include an infrared device and associated circuits and components or a Bluetooth™ communication module to provide for communication with similarly enabled systems and devices. Subsystem 1240 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method, at a signaling entity, for sending a signal to a signaled entity, the method comprising:
   determining, at the signaling entity, at least a first code of a sequence of codes, the at least first code being assigned to the signaling entity by the signaled entity;
   receiving, at the signaling entity, an assignation of resources from the signaled entity for transmission of at least the first code of the sequence of codes;
   transmitting, to the signaled entity, at least the first code of the sequence of codes utilizing the assignation, wherein at least the first code of the sequence of codes is shared among a plurality of signaling entities; and
   sending, to the signaled entity, subsequent codes of the sequence of codes, wherein the sequence of codes is unique to the signaling entity.

2. The method of claim 1, wherein at least one of the subsequent codes of the sequence of codes is shared among the plurality of signaling entities.

3. The method of claim 1, wherein the signaling entity determines at least one code of the sequence of codes utilizing prior knowledge shared with the signaled entity.

4. The method of claim 1, wherein the signaling entity determines resources for transmitting at least one of the codes of the sequence of codes utilizing prior knowledge shared with the signaled entity.

5. The method of claim 1, wherein the signaling entity determines, upon receiving an indication from the signaled entity, at least a one code of the sequence of codes.

6. The method of claim 5, wherein the indication of at least one of the codes of the sequence of codes is received in a control message.

7. The method of claim 5, wherein the indication includes the assignation of resources on which at least one code of the sequence of codes is transmitted.

8. The method of claim 7, wherein the assignation of the resource utilizes a Third Generation Partnership Project Long Term Evolution Physical Uplink Control Channel resource assignment that includes a resource index, a configuration index, and a service request offset.

9. The method of claim 5, wherein the indication includes the first of the sequence of codes as well as pre-allocated subsequent codes of the sequence of codes.

10. The method of claim 5, wherein the receiving is over radio resource control signaling utilizing a Third Generation Partnership Project Long Term Evolution SchedulingRequestConfig information element, wherein the SchedulingRequestConfig information element includes a sequence configuration element.

11. A user equipment acting as a signaling entity comprising:
    a processor; and
    a communications subsystem,
    wherein the processor and communications subsystem are configured to:
    determine, at least a first code of a sequence of codes, the at least first code being assigned to the user equipment by a network element;
    receive, at the user equipment, an assignation of resources from the network element, for transmission of at least the first code of the sequence of codes;
    transmit, to the signaled entity, at least the first code of the sequence of codes utilizing the assignation, wherein at least the first code of the sequence of codes is shared among a plurality of user equipments; and
    send, to the signaled entity, subsequent codes of the sequence of codes, wherein the sequence of codes is unique to the signaling entity.

12. The user equipment of claim 11, wherein the user equipment is configured to determine, at least one code of the sequence of codes, prior to the sending, by receiving an indication from the network element.

13. The user equipment of claim 11, wherein the user equipment is configured to, utilizing at least one of prior knowledge and implicit rules shared with the network element, determine at least one code of the sequence of codes, or the resources, or both the sequence of codes and resources, to transmit at least one code of the sequence of codes.

14. A method, at a network element, acting as a signaled entity, for receiving a signal from at least one of a plurality of user equipments, the method comprising:
    assigning, to the at least one of the plurality of user equipments, a first code of a sequence of codes;
    sending, from the network element, an assignation of resources to the at least one of the plurality of user equipments, to control the transmission of the first code of the sequence of codes;
    receiving, at the network element, the first code of the sequence of codes, where at least the first code of the sequence of codes is shared among a plurality of user equipments;
    further receiving, at the network element, subsequent codes of the sequence of codes; and
    identifying, utilizing the received sequence of codes, the signal received from the at least one of the plurality of user equipments.

15. The method of claim 14, further comprising sending, before receiving from the user equipment, an indication to at least one user equipment of the plurality of user equipments, of at least one code of a sequence of codes.

16. The method of claim 14, further comprising, after the receiving of a code in the sequence of codes, dynamically indicating at least one code of the subsequent codes in the sequence of codes.

17. The method of claim 15, wherein, after the receiving of a code in the sequence of codes, assigning resources only for codes subsequent to the received code in the sequence of codes.

18. The method of claim 15, wherein at least one code of the sequence of codes indicates different priority configurations between subsets of user equipments among the plurality of user equipments.

19. The method of claim 14, wherein the assignation includes a timing for transmission of at least one code from at least a first signaling entity that differs from a timing assigned to at least one code from at least a second signaling entity.

20. The method of claim 15 wherein a number of codes in a first sequence of codes indicated to a first signaling entity is less than the number of codes in a second sequence of codes indicated to a second signaling entity.

21. The method of claim 15, wherein the network element utilizes knowledge of system parameters to determine the sequence of codes to be indicated to a user equipment, the system parameters comprising at least one of: the number of user equipments; quality of service requirements; user equipment class; user equipment capabilities; probability of signaling; resources available for signaling; and traffic load.

22. A network element, acting as a signaled entity, configured for receiving a signal from at least one of a plurality of user equipments, the network element comprising:
- a processor; and
- a communications subsystem,
- wherein the processor and communications subsystem are configured to:
- assign, to the at least one of the plurality of user equipments, a first code of a sequence of codes;
- send, from the network element, an assignation of resources to the at least one of the plurality of user equipments, to control the transmission of the first code of the sequence of codes;
- receive, at the network element, the first code of the sequence of codes, where at least the first code of the sequence of codes is shared among a plurality of user equipments;
- further receive, at the network element, subsequent codes of the sequence of codes; and
- identify, utilizing the received sequence of codes, the signal received from the at least one of the plurality of user equipments.

* * * * *